(12) United States Patent
Kawata et al.

(10) Patent No.: US 9,359,004 B2
(45) Date of Patent: Jun. 7, 2016

(54) DRIVER UNIT AND ELECTRIC POWER STEERING DEVICE INCLUDING THE DRIVER UNIT

(71) Applicant: DENSO CORPORATION, Kariya, Aichi-pref. (JP)

(72) Inventors: Hiroyuki Kawata, Chiryu (JP); Masashi Yamasaki, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/812,866

(22) Filed: Jul. 29, 2015

(65) Prior Publication Data
US 2016/0036305 A1 Feb. 4, 2016

(30) Foreign Application Priority Data

Jul. 31, 2014 (JP) ................................. 2014-156483

(51) Int. Cl.
*B62D 5/04* (2006.01)
*H02K 11/00* (2016.01)
*H02P 25/22* (2006.01)

(52) U.S. Cl.
CPC ............ *B62D 5/0412* (2013.01); *B62D 5/0463* (2013.01); *H02K 11/0073* (2013.01); *H02P 25/22* (2013.01)

(58) Field of Classification Search
CPC ............................. B62D 5/04; B62D 5/0463
USPC ..................................... 180/444, 443; 310/71
See application file for complete search history.

(56) References Cited

U.S. PATENT DOCUMENTS

| | | | | |
|---|---|---|---|---|
| 6,707,185 B2 * | 3/2004 | Hemmi | ............... | B62D 5/0406 310/68 B |
| 7,021,418 B2 * | 4/2006 | Tominaga | ............ | B62D 5/0406 180/444 |
| 8,456,049 B2 * | 6/2013 | Matsuda | ............... | B62D 5/0406 180/444 |
| 2007/0246289 A1 * | 10/2007 | Tominaga | ............ | B62D 5/0406 180/444 |
| 2009/0183940 A1 * | 7/2009 | Sekine | ................. | B62D 5/0406 180/443 |
| 2012/0160596 A1 * | 6/2012 | Yamasaki | ............ | B62D 5/0406 180/443 |
| 2013/0248277 A1 * | 9/2013 | Hagiwara | ............ | B62D 5/0406 180/443 |

FOREIGN PATENT DOCUMENTS

JP 2003-153552 A 5/2003

OTHER PUBLICATIONS

U.S. Appl. No. 14/812,415, filed Jul. 29, 2015, Yamasaki, et al.
U.S. Appl. No. 14/812,757, filed Jul. 29, 2015, Yamasaki, et al.
U.S. Appl. No. 14/812,886, filed Jul. 29, 2015, Yamasaki.

(Continued)

*Primary Examiner* — Tony Winner
(74) *Attorney, Agent, or Firm* — Knobbe, Martens, Olson & Bear, LLP

(57) ABSTRACT

A driver unit has a rotating electric machine and a frame member that is disposed on one axial end of the rotating electric machine. A substrate is fixed onto one surface of the frame member which faces away from the rotating electric machine. Switching elements constituting inverters for switching power supply to winding groups are mounted on a first surface for enabling heat dissipation toward the frame member. An Integrated Circuit (IC) is mounted on the first surface for enabling heat dissipation toward the frame member. An electronic component is mounted on a second surface at an overlapping position that at least partially overlaps a mounting position of the IC.

7 Claims, 17 Drawing Sheets

(56) References Cited

OTHER PUBLICATIONS

U.S. Appl. No. 14/812,807, filed Jul. 29, 2015, Kawata, et al.
U.S. Appl. No. 14/812,769, filed Jul. 29, 2015, Kadoike, et al.
U.S. Appl. No. 14/812,753, filed Jul. 29, 2015, Kabune.
U.S. Appl. No. 14/812,733, filed Jul. 29, 2015, Yamasaki, et al.
U.S. Appl. No. 14/812,767, filed Jul. 29, 2015, Hayashi.

* cited by examiner

DRIVER UNIT AND ELECTRIC POWER STEERING DEVICE INCLUDING THE DRIVER UNIT

CROSS REFERENCE TO RELATED APPLICATION

The present application is based on and claims the benefit of priority of Japanese Patent Application No. 2014-156483, filed on Jul. 31, 2014, the disclosure of which is incorporated herein by reference.

TECHNICAL FIELD

The present disclosure generally relates to a driver unit and an electric power steering device including the driver unit.

BACKGROUND INFORMATION

Conventionally, a motor and an inverter circuit controlling the drive of the motor are positioned close to each other. Such a configuration is known for example, in a Japanese Laid-Open Patent Document No. 2003-153552, (patent document 1) in which a case that houses a circuit board, or a substrate, having an inverter circuit mounted thereon is attached to an outer shell of a compressor.

The patent document 1 discloses a configuration in which an electric power controller semiconductor is mounted on a first circuit board and an Integrated Circuit (IC) chip is mounted on a second circuit board. Further, a plurality of IC chips are mounted in a row on one surface of the second circuit board. That is, as disclosed in the patent document 1, relatively-large-size elements, such as an Application-Specific Integrated Circuit (ASIC), a microcomputer or the like, in a row arrangement requires a large mounting surface on the circuit board, and the constraints such as a diameter of the driver unit make it necessary to split one row arrangement of the large-size elements into two circuit boards (i.e., two substrates).

SUMMARY

An aspect of the present disclosure is to provide a driver unit having many electronic components mounted high-density on one surface of a circuit board, and also to provide an electric power steering device using such a driver unit.

In an aspect of the present disclosure, the driver unit includes a rotating electric machine, a frame member, a substrate, a driver element, an IC component, and an electronic component.

The rotating electric machine has a stator on which a winding is wound, a rotor rotatably disposed relative to the stator, and a shaft that rotates together with the rotor.

The frame member is disposed on one axial end of the rotating electric machine.

The substrate is fixed on an opposite side of the frame member relative to the rotating electric machine.

The driver element includes an inverter for switching an electric current supplied to the winding and is mounted on a first surface of the substrate facing the frame member, for dissipating heat to the frame member.

The IC component is disposed on the first surface for dissipating heat to the frame member. The IC component includes at least one of a pre-driver that outputs a drive signal to the driver element, a regulator that regulates a voltage of a power source and outputs the regulated voltage, and a signal amplifier for amplifying an input signal.

The electronic component is mounted on a second surface that is opposite to the first surface of the substrate, and the position of the electronic component on the second surface at least partially overlaps with the position of the IC component. The electronic component may be, for example, a microcomputer that is used as a part of a control circuit. In the present disclosure, the driver element and the IC component are heat-dissipatably disposed against the frame member. In other words, the frame member serves as an outline of the rotating electric machine, and also serves as a heat sink. In such manner, the number of components of the driver unit is reduced compared to having a heat sink as a separate part, and the size of the driver unit, especially along the axial direction, is reduced.

Further, in the present disclosure, heat of the IC components, which is relatively large due to the integration of many components in one place, is dissipated toward the frame member, instead of dissipating heat toward the substrate side, thereby making it unnecessary for the substrate to have a heat dissipation device such as a heat dissipation via or the like, and enabling a high density mounting of the components based on an advantage that the reverse side of the substrate relative to the IC component is now available for the mounting of the other electronic components. Further, based on the high-density mounting of the electronic components, the volume and/or size of the driver unit is reduced.

Further, the driver unit is used in an electric power steering device. The electric power steering device includes a driver unit and a gear for transmitting an output torque of the electric rotating machine to a drive object, assisting a driver for an operation of a steering wheel by the drive of the drive object with the output torque.

The driver unit of the present disclosure has the substrate, on which various electronic components for the drive control of the rotating electric machine at high density, attached to the frame member that is mounted on one axial end of the rotation electric machine, thereby enabled to have a smaller size along the axial direction. Therefore, workability of the driver unit for the installation of the unit in a small space beside an engine, for example, is improved.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the driver unit in the present disclosure and the electric power steering are described with reference to the drawings.

(First Embodiment)

The driver unit in the first embodiment of the present disclosure and the electric power steering device are shown in FIGS. 1 to 11. Hereafter, in all embodiments described in the following, the same numerals represent the same parts, for the brevity of the description.

Figure 1:
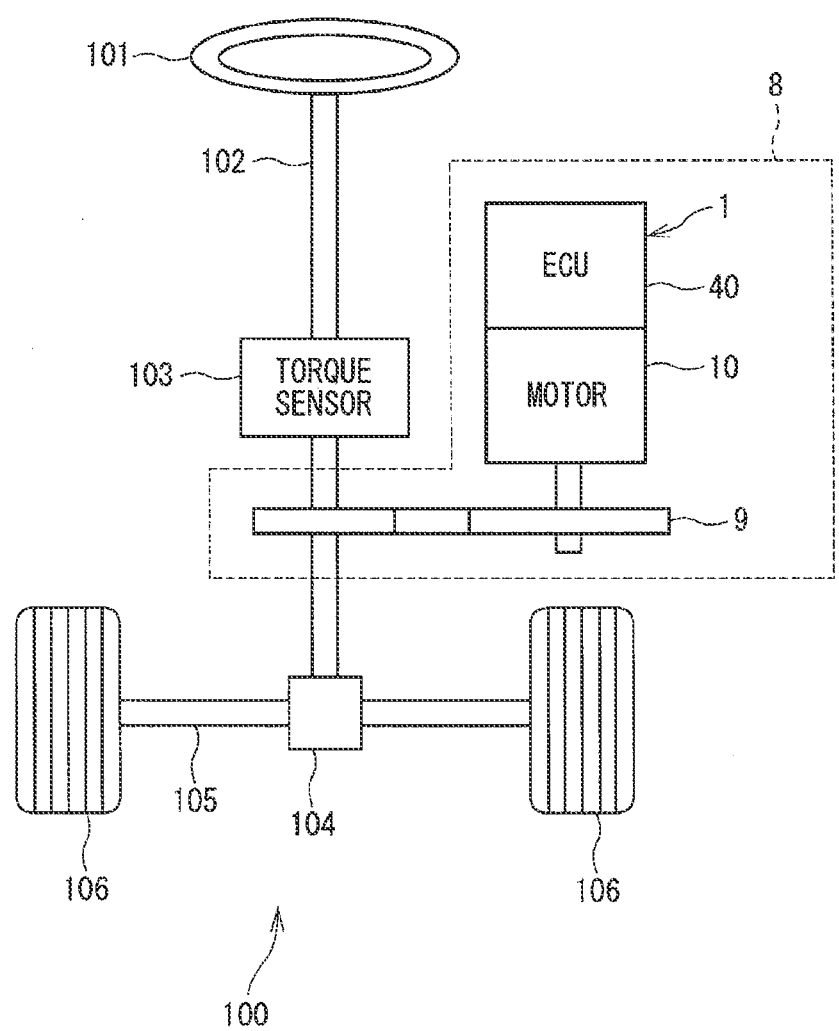
FIG. 1 is a system diagram of an electric power steering in a first embodiment of the present disclosure.

As shown in FIG. 1, a driver unit 1 is applied to an electric power steering device 8 for assisting the steering operation by the driver. The driver unit 1 is a one-body combination of a motor 10 serving as a rotating electric machine and an ECU 40 serving as a controller for controlling the motor 10.

FIG. 1 shows a system diagram of a steering system 100 having the electric power steering device 8. The steering system 100 comprises a steering wheel 101, a column shaft 102, a pinion gear 104, a rack shaft 105, wheels 106, and the electric power steering device 8 etc. respectively serving as a component of the system.

The steering wheel 101 is connected to the column shaft 102, which may also be a type of a driver object. The column shaft 102 has a torque sensor 103 disposed thereon, which is used for detecting a steering torque which is input thereto when the driver operates the steering wheel 101. At a tip of the column shaft 102, the pinion gear 104 is disposed, which is engaged with the rack shaft 105. On both ends of the rack shaft 105, a pair of wheels 106 are disposed via a tie rod and the like.

Thereby, when the driver rotates the steering wheel 101, the column shaft 102 connected to the steering wheel 101 rotates. The rotational movement of the column shaft 102 is turned into a translational movement of the rack shaft 105 by the pinion gear 104, and the pair of wheels 106 are steered by an angle according to an amount of displacement of the rack shaft 105.

The electric power steering device 8 is provided with a speed reduction gear 9 and the driver unit 1. The electric power steering device 8 outputs the assisting torque from the motor 10 based on the signals from the torque sensor 103 and the vehicle speed obtained from a Control Area Network (CAN) which is not illustrated, and transmits the torque to the column shaft 102 via the speed reduction gear 9, for assisting the steering operation of the steering wheel 101. That is, the electric power steering device 8 of the present embodiment is what is designated as a "column assistance" type, which assists a rotation of the column shaft 102 with the torque generated by the motor 10. However, the device 8 may also be used as a "rack assistance" type, which assists the drive of the rack shaft 105. In other words, the column shaft 102 serving as "a drive object" in the present embodiment may be replaced with other objects, e.g., with the rack shaft 105.

Figure 2:
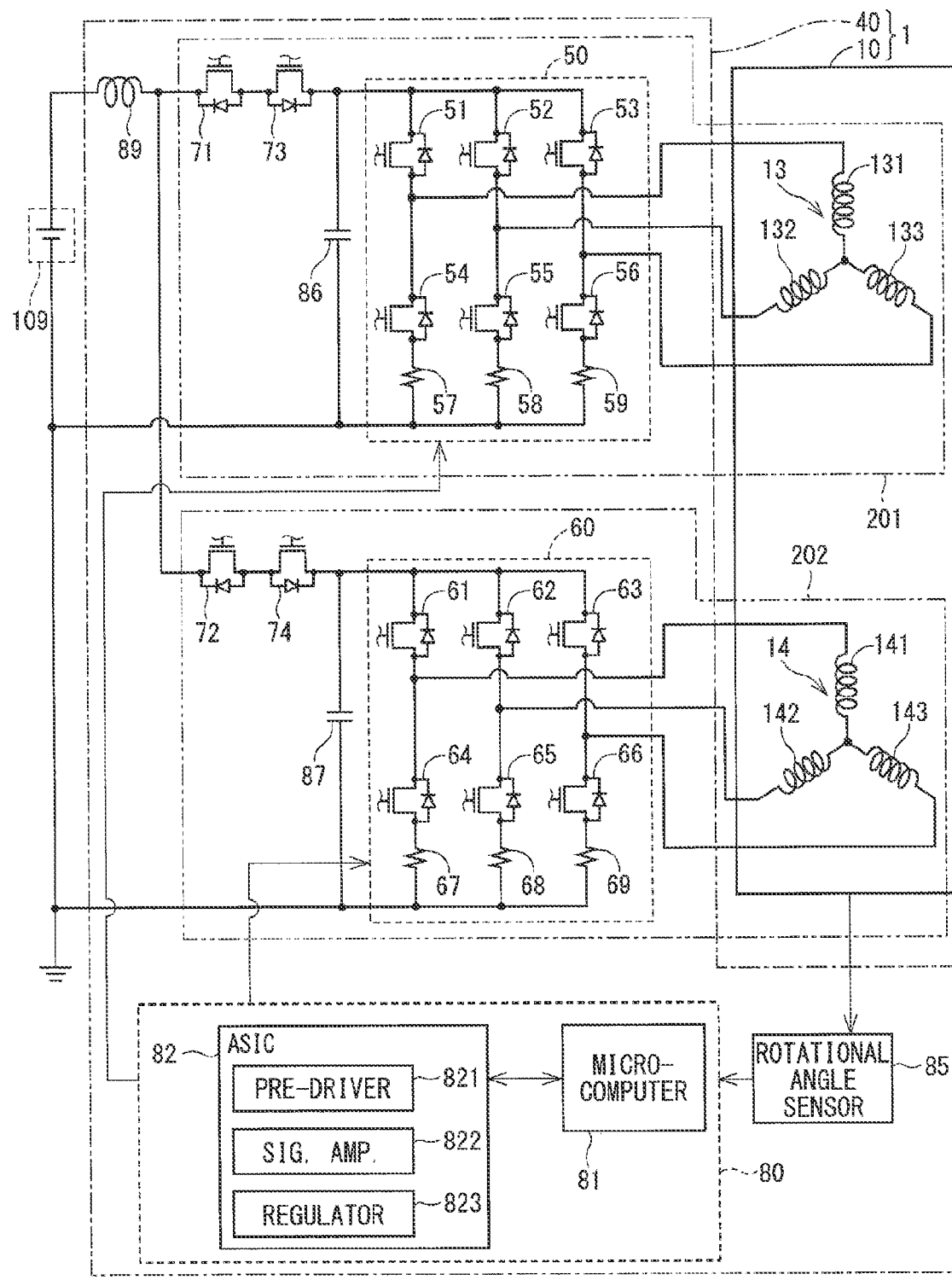
FIG. 2 is a schematic diagram of a circuit configuration of a driver unit in the first embodiment of the present disclosure.

Next, the electrical configuration of the electric power steering device 8 is described based on FIG. 2. In FIG. 2, for the readability of the drawing, some control lines etc. are omitted therefrom.

The motor 10 is a three-phase brushless motor, and has a first winding group 13 and a second winding group 14 respectively wound on a stator 12 which are mentioned later.

The first winding group 13 comprises a U phase coil 131, a V phase coil 132, and a W phase coil 133. The second winding group 14 comprises a U phase coil 141, a V phase coil 142, and a W phase coil 143.

According to the present embodiment, the first winding group 13 and the second winding group 14 respectively correspond to a "winding."

The ECU 40 is provided with a first inverter part 50, a second inverter part 60, power relays 71 and 72, reverse connection protection relays 73 and 74, a control unit 80, a rotational angle sensor 85, capacitors 86 and 87, and a choke coil 89 serving as a coil member.

The first inverter part 50 has six switching elements (SW elements) 51-56 combined in a bridge connection form, for the switching of the power supply to the first winding group 13. The second inverter part 60 has six SW elements 61-66 in a bridge connection form, for the switching of the power supply to the second winding group 14.

Although the SW elements 51-56, 61-66 of the present embodiment are Metal Oxide Semiconductor Field Effect Transistor (MOSFET), other elements such as Insulated Gate Bipolar Transistor (IGBT) and the like may also be used. In the present embodiment, the SW elements 51-56, 61-66 correspond to a "driver element."

As for the SW elements 51, 52, and 53 arranged on the high potential side of the first inverter part 50, the drain is connected to a positive electrode of a battery 109 that serves as a power supply, and the source is connected to the drain of the SW elements 54, 55, and 56 arranged on the low potential side.

The source of the SW elements 54, 55, and 56 is connected to a negative electrode of the battery 109 via current detection elements 57, 58, and 59. The junction points between the SW elements 51, 52, 53 on the high potential side and the SW elements 54, 55, 56 on the low potential side are connected to the U phase coil 131, the V phase coil 132, and the W phase coil 133, respectively.

As for the SW elements 61, 62, and 63 arranged on the high potential side of the second inverter part 60, the drain is connected to the positive electrode of the battery 109, and the source is connected to the drain of the SW elements 64, 65, and 66 arranged on the low potential side.

The source of the SW elements 64, 65, 66 is connected to the negative electrode of the battery 109 via current detection elements 67, 68, and 69. The junction points between the SW elements 61, 62, 63 on the high potential side and the SW elements 64, 65, 66 on the low potential side are connected to the U phase coil 141, the V phase coil 142, and the W phase coil 143, respectively.

The current detection elements 57, 58, and 59 are disposed on the low potential side of the SW elements 54-56 respectively corresponding to the three phases of the first winding group 13, for detecting the electric current in each of the three phases of the first winding group 13.

The current detection elements 67, 68, and 69 are disposed on the low potential side of the SW elements 64-66 respectively corresponding to the three phases of the second winding group 14, for detecting the electric current in each of the three phases of the second winding group 14.

The current detection elements 57-59, 67-69 of the present embodiment are implemented as shunt resistors.

The power relay 71 is disposed at a position between the battery 109 and the first inverter part 50, and conducts or intercepts the electric current between the battery 109 and the first inverter part 50.

The power relay 72 is disposed at a position between the battery 109 and the second inverter part 60, and conducts or intercepts the electric current between the battery 109 and the second inverter part 60.

The reverse connection protection relay 73 is disposed at a position between the power relay 71 and the first inverter part 50. The reverse connection protection relay 74 is disposed at a position between the power relay 72 and the second inverter part 60.

The reverse connection protection relays 73 and 74 prevent the electric current flowing in a reverse direction for the protection of the ECU 40, (e.g., in the case when the battery 109 is connected in reverse) by having a parasitic diode connected in reverse relative to the power relays 71, 72.

In the present embodiment, the power relays 71, 72 and the reverse connection protection relays 73, 74 are all MOS-FETS. However, other semiconductor elements such as IGBT and the like may also be used as those relays. In the present embodiment, the power relays 71, 72 and the reverse connection protection relays 73, 74 correspond to a "relay."

The control unit 80 has a microcomputer 81, which serves as an electronic component and a calculation circuit, and an ASIC 82, which serves as an IC circuit, together with other parts, which are integrated circuit components.

The microcomputer 81 calculates an instruction value concerning the power supply to the first winding group 13 and the second winding group 14 based on the signal from the torque sensor 103 or the rotational angle sensor 85 and the like.

The ASIC 82 comprises a pre-driver 821, a signal amplifier 822, a regulator 823, and the like.

The pre-driver 821 generates a driving signal based on the instruction value, and outputs the generated driving signal to the first inverter part 50 and to the second inverter part 60. More practically, the pre-driver 821 outputs the generated driving signal to the gate of the SW elements 51-56, 61-66. By the switching operation of the SW elements 51-56, 61-66 according to the driving signal, an AC current according to the instruction value is supplied to the first winding group 13 and to the second winding group 14 from the first inverter part 50 and the second inverter part 60, respectively. Thereby, the motor 10 is driven.

The signal amplifier 822 amplifies the detection signal (i.e., a voltage between both terminals in the present embodiment) of the current detection elements 57-59, 67-69, and the detection value of the rotational angle sensor 85, and outputs them to the microcomputer 81. Further, the regulator 823 is a stabilization circuit which stabilizes the voltage supplied to the microcomputer 81 and the like.

The signal amplifier 822 amplifies and outputs (i) detection signals from the current detection elements 57-59, 67-69 (i.e., an inter-terminal detection value in the present embodiment) and (ii) a detection value of the rotational angle sensor 85.

The capacitor 86 is connected in parallel with the first inverter part 50. The capacitor 87 is connected in parallel with the second inverter part 60. In the present embodiment, the capacitors 86 and 87 are the aluminum electrolytic capacitors, and are disposed on the inverter side (i.e., on one side close to the inverter parts 50, 60) of the relays 71-74. The choke coil 89 is connected at a position between the battery 109 and the positive electrodes of the capacitors 86 and 87. In the present embodiment, the choke coil 89 is disposed on the battery side (i.e., on one side close to the battery 109) of the relays 71-74). The capacitors 86 and 87 and the choke coil 89 serve as a filter circuit, reducing the noise transmitted from the driver unit 1 to the other devices that share the power supply from the battery 109 with the driver unit 1, and also reducing the noise transmitted from the other devices back to the driver unit 1 sharing the battery 109. The capacitors 86 and 87 store the electric charge, and support the electric power supply to the first inverter part 50 and the second inverter part 60.

In the present embodiment, the first inverter part 50, the power relay 71, the reverse connection protection relay 73, and the capacitor 86 are grouped as a first system 201, corresponding to the first winding group 13. Further, the second inverter part 60, the power relay 72, the reverse connection protection relay 74, and the capacitor 87 are grouped as a second system 202, corresponding to the second winding group 14. That is, a drive control of the motor 10 is performed in plural systems (i.e., in two systems in the present embodiment).

Figure 3:
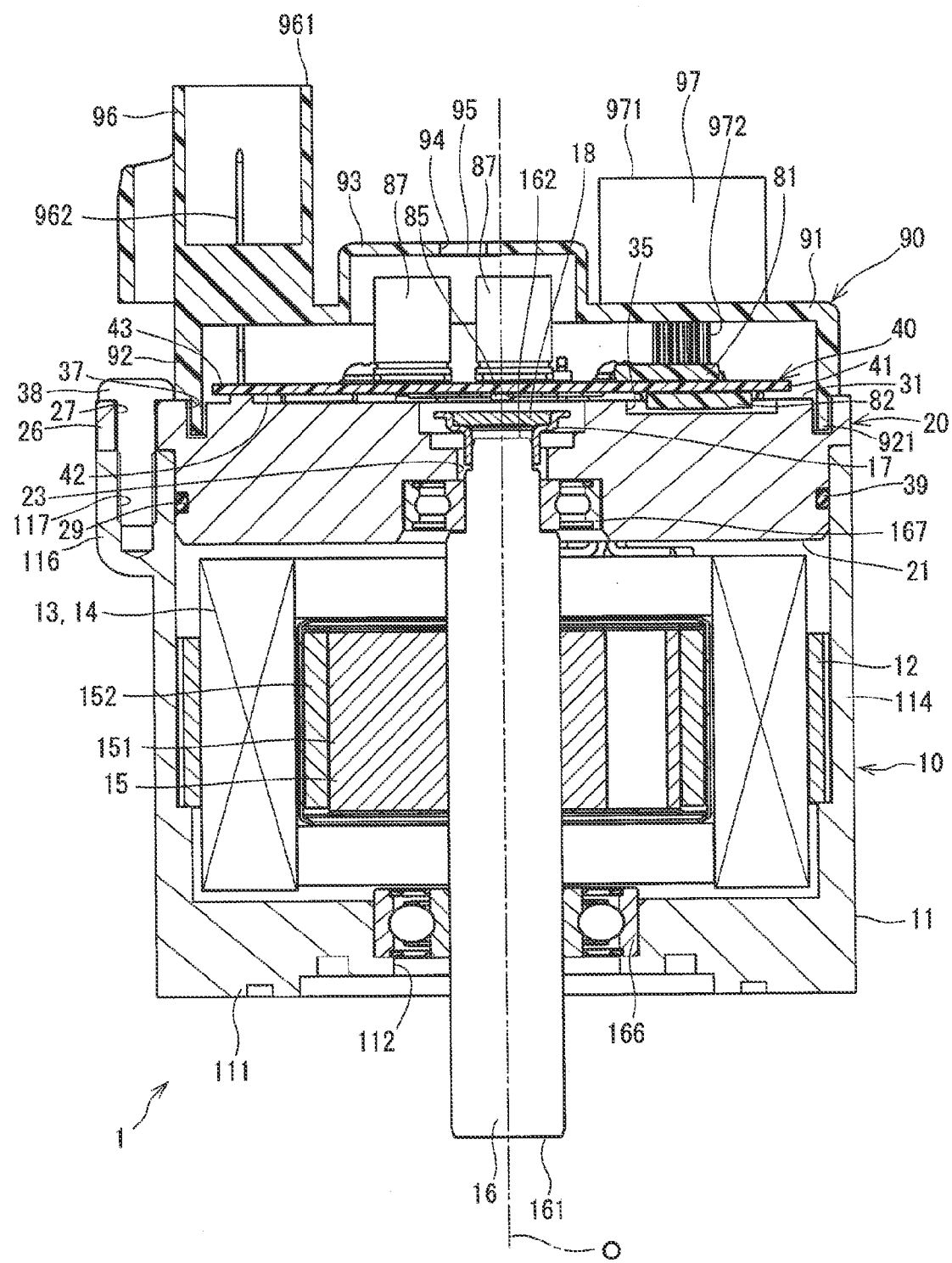
FIG. 3 is a sectional view of the driver unit in the first embodiment of the present disclosure.
Figure 4:
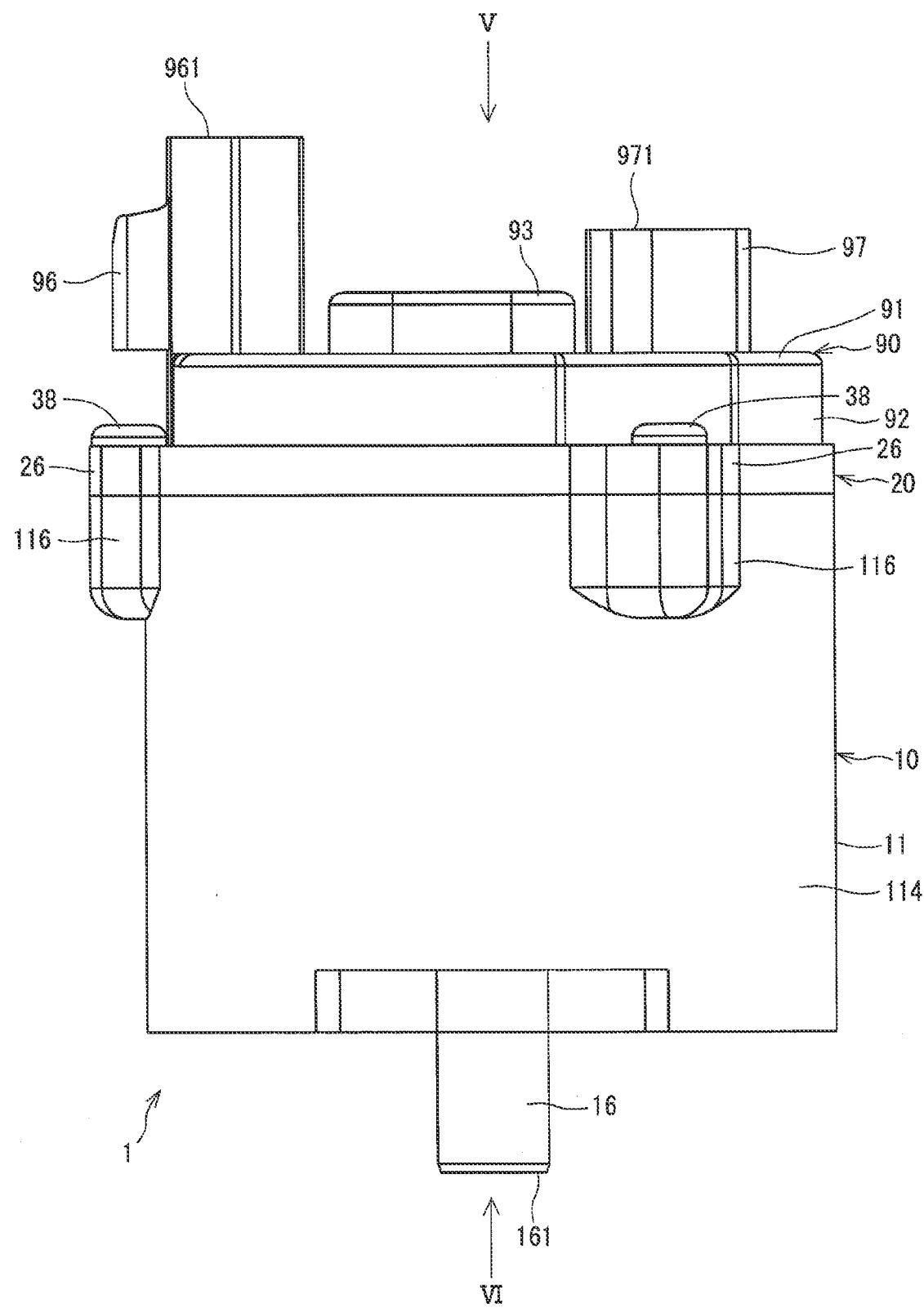
FIG. 4 is a side view of the driver unit in the first embodiment of the present disclosure.
Figure 5:
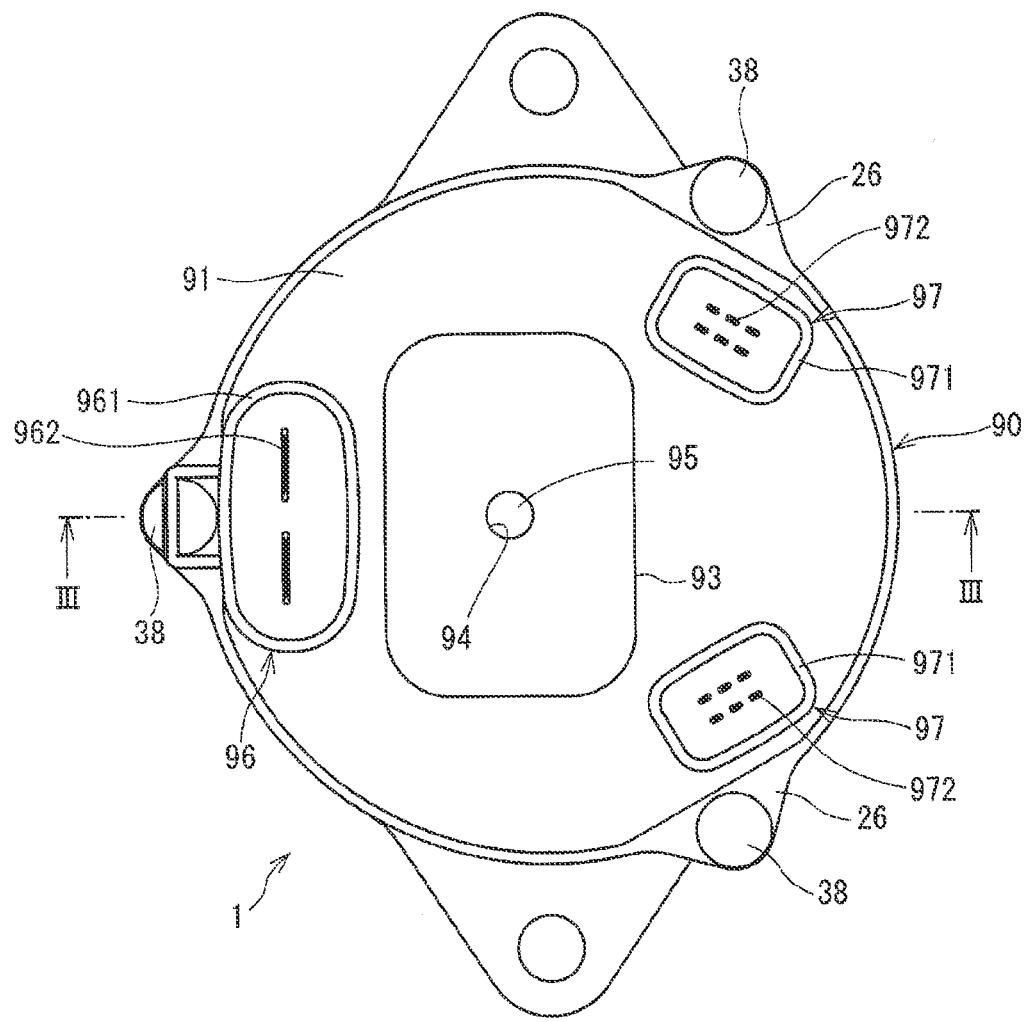
FIG. 5 is a top view of the driver unit along an arrow V in FIG. 4.
Figure 6:
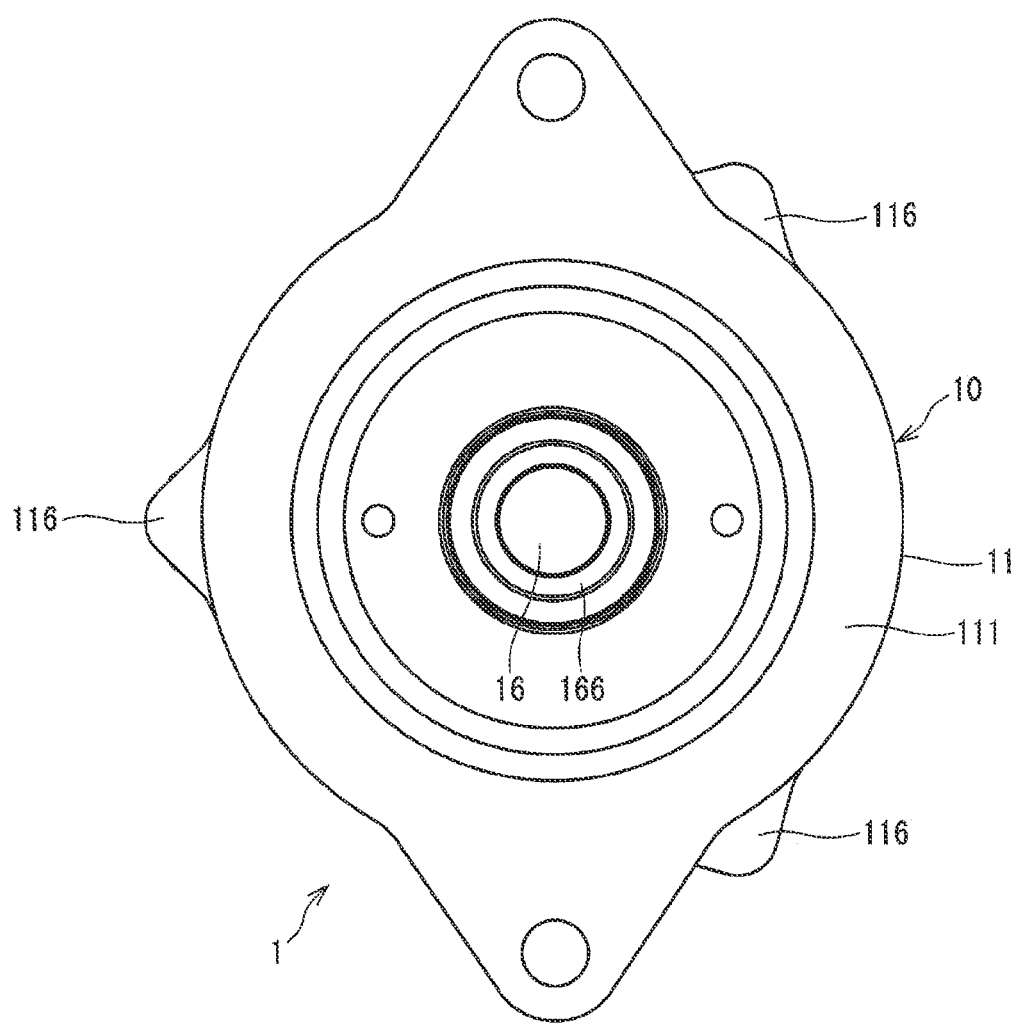
FIG. 6 is a bottom view of the driver unit along an arrow VI in FIG. 4.

Next, a structure of the driver unit 1 is described based on FIGS. 3-11. In the following, an axial direction of the motor 10 may simply be designated as an "axial direction," and a radius direction of the motor 10 may simply be designated as a "radius direction." FIG. 3 is a sectional view along a III-III line of FIG. 5.

As shown in FIGS. 3-8, the driver unit 1 is provided with the motor 10, a frame member 20, the ECU 40, and a cover member 90, together with other parts.

As shown in FIG. 3, the motor 10 has a motor case 11, a stator 12, the first winding group 13, the second winding group 14, a rotor 15, a shaft 16 and other parts.

The motor case 11 has a bottom part 111 and a cylinder part 114, for example, is formed in a cylinder shape dosed on one end, (i.e., having a bottom on one end) and is made from metal, such as aluminum. The motor case 11 of the present embodiment is made from aluminum, and, as for the surface of the case 11, the anodized aluminum treatment is performed. The bottom part 111 of the motor case 11 is positioned away from the ECU 40, i.e., on an opposite side, and an opening of the motor case 11 is dose to the ECU 40 (i.e., on the ECU side). In the present embodiment, the cylinder part 114 correspond to a "cylinder part of the rotating electric machine," and a projection area of the cylinder part 114 along the axial direction correspond to a "motor region."

A shaft hole 112 into which one end 161 of the shaft 16 is inserted is disposed substantially at the center of the bottom part 111. Further, a bearing 166 is fitted to the bottom part 111.

On or around the opening of the cylinder part 114, a fixing tab 116 for fixedly disposing the frame member 20 is formed (i.e., projecting radially outward from an outer wall of the cylinder part 114). The fixing tab 116 has a screw-threaded hole 117 bored thereon. The fixing tab 116 of the present embodiment is disposed at three positions around the cylinder part 114 at the same interval.

The stator 12 has a layered part (i.e., a layered structure) of a magnetizable thin metal such as iron, and an insulator disposed on a radial outside of the layered part, and the stator 12 is fixedly disposed in an inside of the motor case 11. The number of sheets of the thin metal in the layered part of the stator 12 may be changed according to the output required for the motor 10. Thereby, the output of the motor 10 can be changed by changing the axial length of the stator 12, without changing the radius length of the motor 10.

The first winding group 13 and the second winding group 14 are wound on the insulator of the stator 12. For each of the three phases, a first motor line 135 is taken out from the first winding group 13, and for each of the three phases, a second motor line 145 is taken out from the second winding group 14. The motor lines 135 and 145 are taken out (i.e., extend) from the motor case 11 toward the ECU 40 (see FIG. 7).

The first motor line 135 includes a first U phase motor line 136 and a first V phase motor line 137 and a first W phase motor line 138, and the three lines 136, 137, 138 are positioned away in a numeral ascending order from the power relays 71 and 72.

The second motor line 145 includes a second U phase motor line 146 and a second V phase motor line 147 and a second W phase motor line 148, and the three lines 146, 147, 148 are positioned away in a numeral descending order from the power relays 71 and 72.

The first U phase motor line 136 and the second U phase motor line 146, and the first V phase motor line 137 and the second V phase motor line 147, and the first W phase motor line 138 and the second W phase motor line 148 are respectively arranged at point-symmetric positions around a center axis O of the motor 10 mentioned later. Further, the first U phase motor line 136 and the first W phase motor line 138 are symmetric against the first V phase motor line 137. Similarly, the second U phase motor line 146 and the second W phase motor line 148 are symmetrically positioned against the second V phase motor line 147.

Thereby, the magnetic flux leakage from the first motor line 135 and the magnetic flux leakage from second the motor line 145 cancel with each other. Further, the influence of the magnetic flux leakage on the rotational angle sensor 85 that is mounted at a position on the center axis O of the motor 10 is reduced in such configuration, thereby reducing the detection error of the sensor 85.

Here, "symmetry" means a substantially-symmetric arrangement of those lines, for the cancellation of the magnetic flux leakage, allowing a dimension error in the actual product.

The rotational angle sensor 85 includes a magnetism detection element, and detects a rotation angle of the rotor 15 by detecting a rotating magnetic field from a magnet 18 provided on an other end 162 of the shaft 16.

The rotor 15 has a rotor core 151 and a permanent magnet 152. The rotor core 151 is formed in an approximately cylindrical shape, for example, and is made from a magnetic material, e.g. iron, and is coaxially arranged in an inside of the stator 12 (i.e., in a radius inside of the stator 12).

The permanent magnet 152 is disposed on a radius outside of the rotor core 151, and the N poles and the S poles of the rotor core 151 alternate with each other.

The shaft 16 is formed in a rod shape, for example, with metal, and is fitted at the center position (i.e., on a rotation axis of the rotor core 151). The shaft 16 is rotatably supported by the bearing 166 fitted on the bottom part 111 of the motor case 11 and by a bearing 167 fitted on the frame member 20. Thereby, the shaft 16 is rotatable with the rotor 15. Further, an outer wall of the rotor 15 and an inner wall of the stator 12 are interposed with an air gap.

The one end 161 of the shaft 16 is inserted into the shaft hole 112 that is bored on the bottom part 111 of the motor case 11, and projects toward an outside of the motor case 11. The one end 161 of the shaft 16 serves as an output end, which is connected to the speed reduction gear 9, for outputting the torque from the motor 10 toward the column shaft 102 via the speed reduction gear 9 (see FIG. 1), even though a connection between the output end and the speed reduction gear 9 is not explicitly illustrated.

The other end 162 of the shaft 16 has a magnet holder part 17 that holds the magnet 18.

Figure 7:
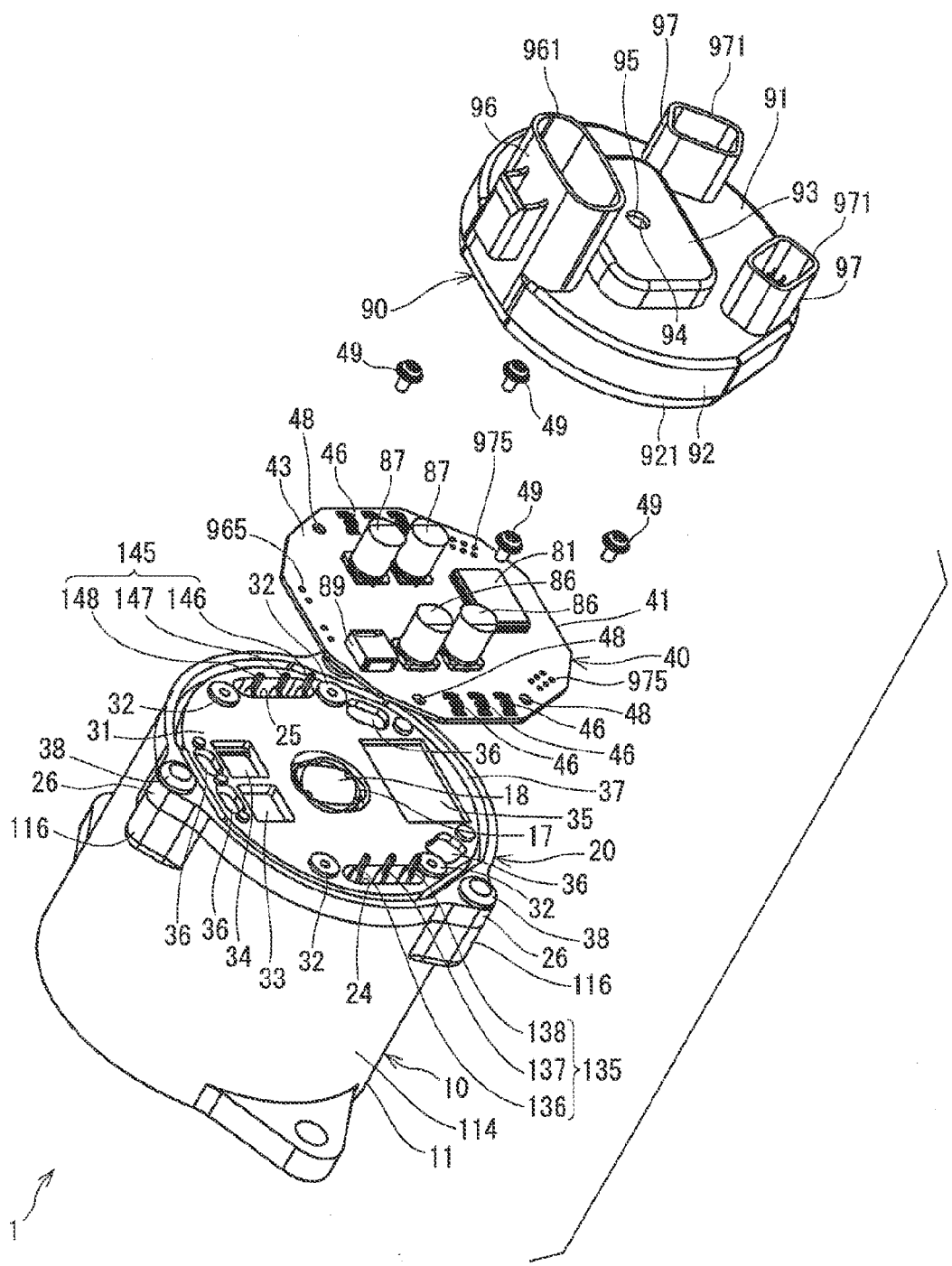
FIG. 7 is an exploded perspective view of the driver unit in the first embodiment of the present disclosure.

As shown in FIG. 3 and FIG. 7, for example, the frame member 20 made from highly-heat-conductive metal, such as aluminum or the like, is formed in a lid shape for closing the opening of the motor case 11 (i.e., is inserted into a radial inside of the cylinder part 114). Here, one side of the frame member 20 close to the motor 10 is designated as a motor side face 21, and the other side of the frame member 20 away from the motor 10 and close to the ECU 40 is designated as an ECU side face 31.

A shaft hole 23 is bored substantially at the center of the frame member 20. The other end 162 of the shaft 16 is inserted into the shaft hole 23. Thereby, the magnet 18 disposed on the other end 162 of the shaft 16 is exposed to (i.e., faces) the ECU 40. The bearing 167 is fitted on the frame member 20.

Further, the frame member 20 has a motor line insertion hole 24 into which the motor line 135 is inserted and a motor line insertion hole 25 into which the motor line 145 is inserted. Thereby, the motor lines 135 and 145 are taken out therefrom to extend toward the ECU 40.

The frame member 20 has a fixing tab 26 which projects outward in a radius direction at corresponding positions (i.e., three positions in the present embodiment) corresponding to the fixing tab 116 of the motor case 11. The fixing tab 26 has a through hole 27 bored thereon. A frame lockscrew 38 is inserted into the through hole 27, and is tightly screwed into the screw-threaded hole 117. Thereby, the frame member 20 is fixed onto the motor case 11.

At an outer periphery of the frame member 20 and around the motor side face 21 which is close to the bottom part 111 than the fixing tab 26, an O ring groove 29 is provided, into which an O ring 39 is fitted, and the O ring 39 bound by the O ring groove 29 and the cylinder part 114 provides a watertight structure. Thereby, water and the like are prevented from intruding into the motor 10 via a position between the motor case 11 and the frame member 20.

The ECU side face 31 of the frame member 20 has a substrate fixing tab 32, relay rooms 33 and 34, an ASIC room 35, a terminal receptacle groove 36, and an adhesion groove 37.

As shown in FIGS. 3, 7-11, the ECU 40 is disposed away from the motor 10 relative to the frame member 20 (i.e., with the frame member 20 interposed therebetween). The ECU 40 is positioned substantially within the motor region, and is substantially coaxially disposed with the motor 10.

The ECU 40 has a substrate 41 on which many electronic components are mounted. For example, the ECU 40, provided with the first inverter part 50, the second inverter part 60, the power relays 71 and 72, the reverse connection protection relays 73 and 74, the control unit 80, the rotational angle sensor 85, the capacitors 86 and 87, and the choke coil 89 serving as a coil member are respectively mounted on the substrate 41. That is, in the present embodiment, the electronic components, which may include the ECU 40, are mounted on one substrate 41. In such configuration, the number of substrates in the ECU 40 is reduced in comparison to a case where plural substrates 41 are used, thereby reducing the volume of the ECU 40.

The substrate 41 is formed in a shape that fits in the motor region. In the present embodiment, more practically, the substrate 41 is contained within the groove region (i.e., in a radius inside of the adhesion groove 37) provided on the ECU side face 31 of the frame member 20. In other words, the ECU components on the substrate 41, such as the SW elements 51-56, 61-66, the current detection elements 57-59, 67-69, the capacitors 86, 87, and the choke coil 89, are positioned within the motor region.

Here, one side of the substrate 41 close to the motor 10 is designated as a heat generation element mounting surface 42, and the other side, a surface away from the motor 10, is designated as a large-size component mounting surface 43. In the present embodiment, the heat generation element mounting surface 42 corresponds to a "first surface," and the large-size component mounting surface 43 corresponds to a "second surface."

Figure 8:
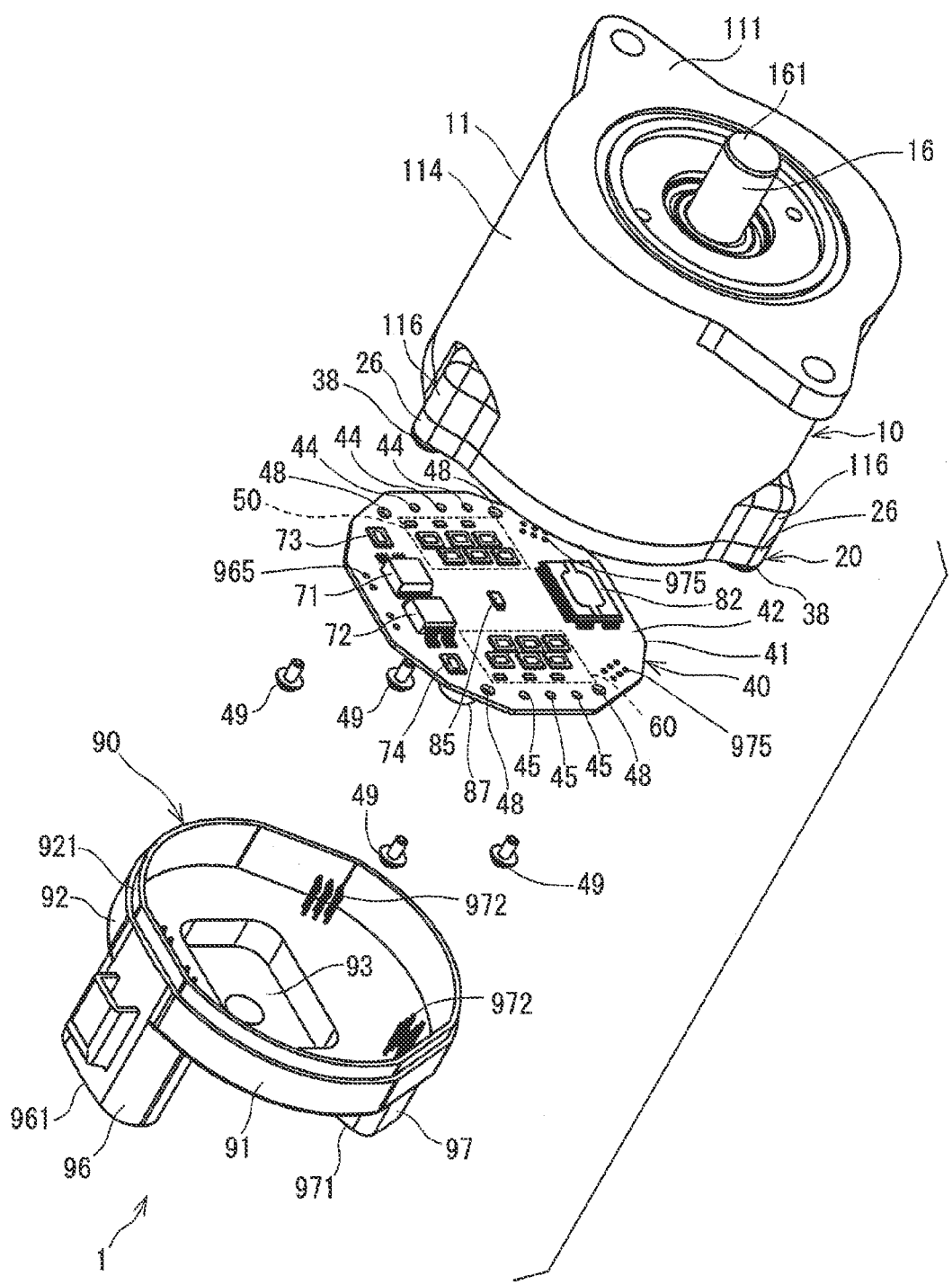
FIG. 8 is another exploded perspective view of the driver unit in the first embodiment of the present disclosure.
Figure 9:
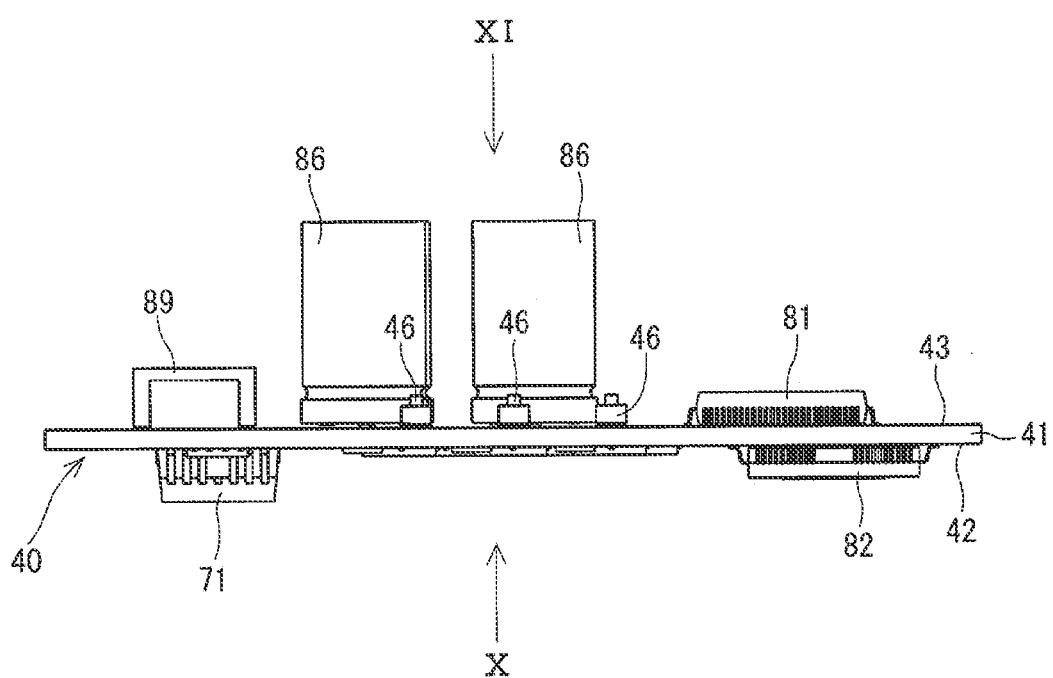
FIG. 9 is a side view of an Engine Control Unit (ECU) in the first embodiment of the present disclosure.
Figure 10:
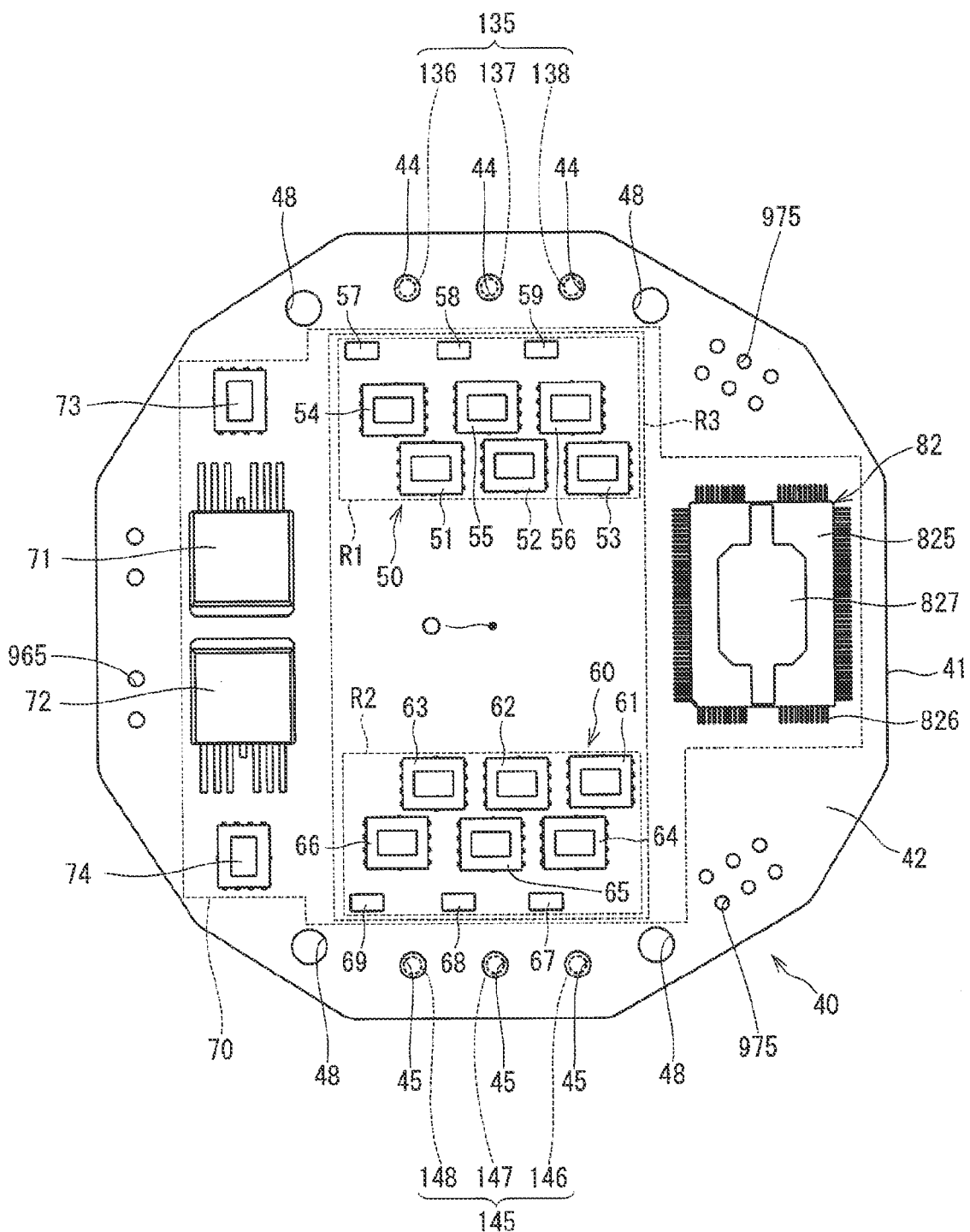
FIG. 10 is a bottom view of the ECU along an arrow X in FIG. 9.

As shown in FIG. 8 and FIG. 10, for example, the SW elements 51-56, 61-66 as well as the current detection elements 57-59, 67-69, the power relays 71, 72, the reverse connection protection relays 73, 74, the ASIC 82, and the rotational angle sensor 85 are surface-mounted on the heat generation element mounting surface 42 together with other parts. The rotational angle sensor 85 is omitted from the illustration in FIG. 10. In the present embodiment, all components mounted on the heat generation element mounting surface 42 and the microcomputer 81 mounted on the large-size component mounting surface 43 are respectively surface-mounted thereon.

The rotational angle sensor 85 is mounted substantially at a center position on the heat generation element mounting surface 42, which faces the magnet 18 which is exposed from the frame member 20. Here, when the axis line of the shaft 16 and its extension are considered as the center axis O of the motor 10, the rotational angle sensor 85 is mounted on the center axis O of the heat generation element mounting surface 42 (see FIG. 3).

A first region R1, where the SW elements 51-56 of the first inverter part 50 are mounted, and a second region R2, where the SW elements 61-66 and the current detection elements 67-69 of the second inverter part 60, are symmetrically arranged on the opposite sides of the center axis O of the motor 10. In the present embodiment, the SW elements 51-56 and the SW elements 61-66 are arranged as axially-symmetric on both sides of a straight line passing through the center axis O of the motor 10.

The three phases of U, V, W are arranged in order from the relay 71 side in the first inverter part 50, and the three phases of W, V, U are arranged in order from the relay 72 side in the second inverter part 60, which makes a point-symmetric relation between the two inverters 50, 60 for the three phases. In the present embodiment, when an area in which the power relays 71, 72 are mounted is considered as a power supply region for supplying electric power from the battery 109 to the substrate 41, the first inverter 50 has the first, second and third phases arranged from the power supply region side, and the second inverter 60 has the third second first phases arranged from the power supply region side. The same applies to the motor lines 135, 145. That is, the phase sequence of the second system 202 is in a reverse order to the phase sequence of the first system 201.

Thereby, while the impedance is reduced, the length of wiring in each of the three phases on the substrate 41 is substantially equated, and the variation of the impedance in each of the three phases is reduced, or the impedance is equated in all phases. The "symmetry" in the above means a substantially-symmetric arrangement of the three phases, allowing a dimension error in the actual product.

Further, the SW elements 54-56 connected to the low potential side are arranged on the outside of the SW elements 51-53 connected to the high potential side, and the current detection elements 57-59 are arranged further on the outside thereof.

Similarly, the SW elements 64-66 connected to the low potential side are arranged on the outside of the SW elements 61-63 connected to the high potential side, and the current detection elements 67-69 are arranged further on the outside thereof.

Each of the SW elements 51-56 has a drain formed on the substrate 41 side surface. Further, the motor line 135 is connected to a source of each of the SW elements 51-53 that are connected on a high-potential side and to a drain of each of the SW elements 54-56 that are connected on a low-potential side (FIG. 2). Therefore, by positioning the low-potential side SW elements 54-56 on the radius outside of the high-potential side SW elements 51-53, the wiring on the substrate 41 is easily made, because the low-potential side SW elements 54-56 are connected to the motor line 135 that is positioned outside of the elements 54-56.

The same configuration applies to the configuration of the SW elements 61-66 and the motor line 145.

When the first region R1 and the second region R2 together with the center axis O are considered as a drive element mounting region R3, the ASIC 82 is positioned on an outside of the drive element mounting region R3. Further, the power relays 71, 72 and the reverse connection protection relays 73, 74 are positioned on an opposite side of the ASIC 82, relative to the drive element mounting region R3. In the present embodiment, the regions R1 to R3 are respectively illustrated as rectangular areas. However, the regions R1 to R3 may have other shapes other than the rectangular shapes, depending on the outline of an area that is defined to include mounting positions of all elements (i.e., the SW elements 51-56, 61-66 and the current detection elements 57-59, 67-69).

On one side of each of the SW elements 51-56, 61-66, the current detection elements 57-59, 67-69, the power relays 71, 72, the reverse connection protection relays 73, 74, and the ASIC 82 which are mounted on the heat generation element mounting surface 42, (i.e., on a side facing the frame member 20) a heat dissipation slug made of heat conductive metal (e.g., copper) is disposed which is exposed from the resin mold. Further, the SW elements 51-56, 61-66, the current detection elements 57-59, 67-69, the power relays 71, 72, the reverse connection protection relays 73, 74, and the ASIC 82 respectively contact the ECU side face 31 of the frame member 20 in a heat transferable manner via a heat dissipation gel which is not illustrated. Thereby, heat generated by the SW elements 51-56, 61-66, the current detection elements 57-59, 67-69, the power relays 71, 72, the reverse connection protection relays 73, 74, and the ASIC 82 is dissipated via the heat dissipation gel to the frame member 20. In FIG. 3 or other drawings, the ASIC 82 and the frame member 20 may look as if they are disposed in a non-contacting state, as a result of the omission of the heat dissipation gel.

That is, the SW element 51-56, 61-66, current detection elements 57-59, 67-69, the power relays 71, 72, the reverse connection protection relays 73, 74, and the ASIC 82 constitute a heat generation element 70 in the present embodiment.

The power relays 71, 72, which are a large size element in comparison to the SW elements 51-56, 61-66 and the reverse connection protection relays 73, 74, are accommodated in the relay rooms 33, 34 provided on the ECU side face 31 of the frame member 20.

The ASIC 82, which is a large size element in comparison to the SW elements 51-56, 61-66 and the reverse connection protection relays 73, 74, is accommodated in the ASIC room 35 provided on the ECU side face 31 of the frame member 20.

In the present embodiment, the frame member 20 defines an outline of the motor 10, provides a support for the ECU 40, and provides a heat dissipation path for dissipating heat from the heat generation element 70. Thereby, as compared with a case in which a heat sink is provided separately, the number of components is reduced, and the volume of the driver unit is reduced.

Figure 11:
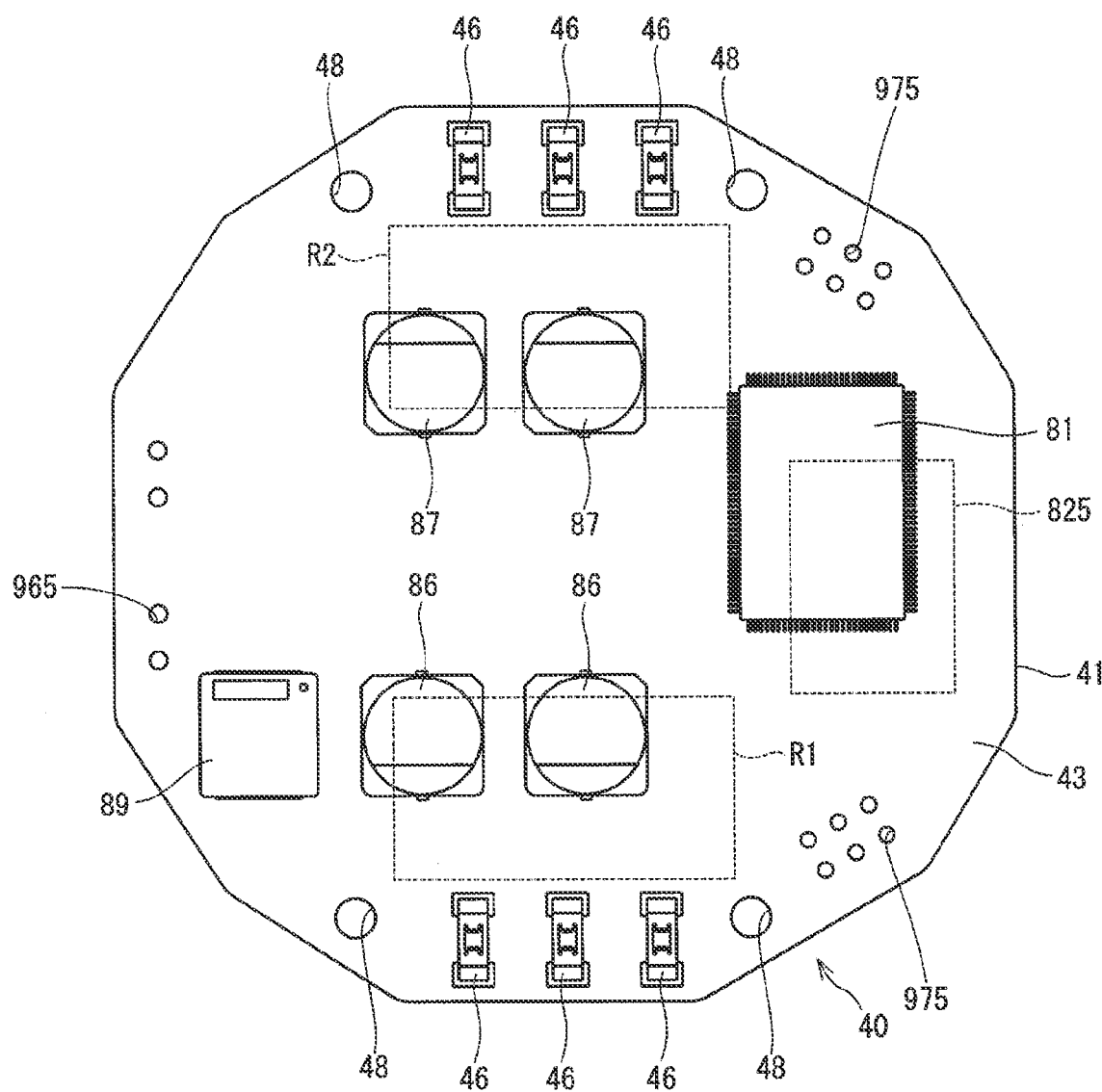
FIG. 11 is a top view of the ECU along an arrow XI in FIG. 9.

As shown in FIG. 7 and FIG. 11, for example, the microcomputer 81, the capacitors 86, 87, and the choke coil 89 are mounted on the large-size component mounting surface 43, together with other parts. The microcomputer 81 is mounted at a position on a reverse side of the substrate 41 (i.e., partially overlapping with the ASIC 82) as seen in FIG. 11.

The capacitor 86 is mounted on a reverse side of the substrate 41, (i.e., partially overlapping with the first region R1) in which the SW elements 51-56 of the first inverter part 50 are mounted. The capacitor 87 is mounted on a reverse side of the substrate 41, (i.e., partially overlapping with the second region R2) in which the SW elements 61-66 of the second inverter part 60 are mounted. The noise reduction effect increases by arranging the capacitors 86, 87 on the reverse side of the inverter parts 50, 60.

In the present embodiment, by mounting relatively large-size electronic components, e.g., the capacitors 86, 87 and the choke coil 89, on the large-size component mounting surface 43, the substrate 41 is positioned at a proximity of the frame member 20. Thereby, heat generated by the heat generation element 70 on the heat generation element mounting surface 42 is dissipated to the frame member 20 from the "back" of those components.

A radius outside position of the first region R1 has a motor line insertion hole 44 bored therethrough. The motor line 135 is inserted into the motor line insertion hole 44. A radius outside position of the second region R2 has a motor line insertion hole 45 bored therethrough. The motor line 145 is inserted into the motor line insertion hole 45.

On the large-size component mounting surface 43, a motor line connector 46 made from a conductive metal or the like is provided at a position where the motor line insertion holes 44 and 45 are bored. The motor line connector 46 has a press-fit part, and the press-fit part receiving the motor lines 135 and 145 establishes an electrical connection between the substrate 41 and the motor lines 135, 145.

A hole 48 is bored at a position corresponding to the substrate fixing tab 32 of the substrate 41. A substrate lockscrew 49 (see FIGS. 7 and 8) is inserted into the hole 48, and is tightly screwed onto the substrate fixing tab 32 of the frame member 20. The substrate 41 is fixed onto the frame member 20.

As shown in FIGS. 3-8, a cover member 90 has a cover body 91, the power supply connector 96, and a signal connector 97, and covers the large-size component mounting surface 43 side of the substrate 41.

An insert portion 921 is provided at one end of a peripheral wall 92 of the cover body 91. The insert portion 921 is inserted into the adhesion groove 37 of the frame member 20, and is fixed by the adhesive. Thereby, water or the like is prevented from intruding into the motor 10 from a connection portion between the frame member 20 and the cover member 90.

A capacitor room 93 is formed substantially at the center of the cover body 91. The capacitor room 93 protrudes from the cover body 91 (i.e., away from the motor 10) for accommodating the capacitors 86, 87. A breathing hole 94 is bored on the capacitor room 93. The breathing hole 94 has a filter member 95 attached thereon. The filter member 95 is made from a material that passes air but does not pass the water. By having the filter member 95 in the breathing hole 94, the inner pressure of the driver unit 1 stays constant at a certain value even when the temperature changes.

The power supply connector 96 and the signal connector 97 (i.e., "connectors 96 and 97" hereinafter) respectively protrude away from the cover body 91 (i.e., away from the motor 10). In the present embodiment, the connectors 96 and 97 are integrally formed with the cover body 91 in one body.

The power supply connector 96 has an opening 961 disposed on one end which extends away from the motor 10, for a connection to a harness (not illustrated) that extends from the battery 109. Further, the power supply connector 96 has a power supply connector terminal 962 connected to the substrate 41. The power supply connector terminal 962 is inserted into a terminal insertion hole 965 bored on the substrate 41, and is connected to the substrate 41 by solder or the like. Thereby, the ECU 40 is connected to the battery 109.

The signal connector 97 has an opening 971 disposed on one end which extends away from the motor 10, for a connection to a harness (not illustrated). In the present embodiment, two signal connectors 97 are provided, among which one is connected to a harness extending from the torque sensor 103 and the other is connected to a harness extending from CAN. Further, the signal connector 97 has a signal connector terminal 972 connected to the substrate 41. The signal connector terminal 972 is inserted into a terminal insertion hole 975 disposed on the substrate 41, and is connected to the substrate 41 by solder or the like. Thereby, information from the torque sensor 103 and information from CAN are input into the ECU 40.

The tip of each of the power supply connector terminal 962 and the signal connector terminal 972 (i.e., "terminals 962 and 972" hereinafter) is inserted into the terminal receptacle groove 36 that is formed on the ECU side surface 31 of the frame member 20, so that the terminals 962, 972 and the frame member 20 are not short-circuited with each other.

Figure 17:
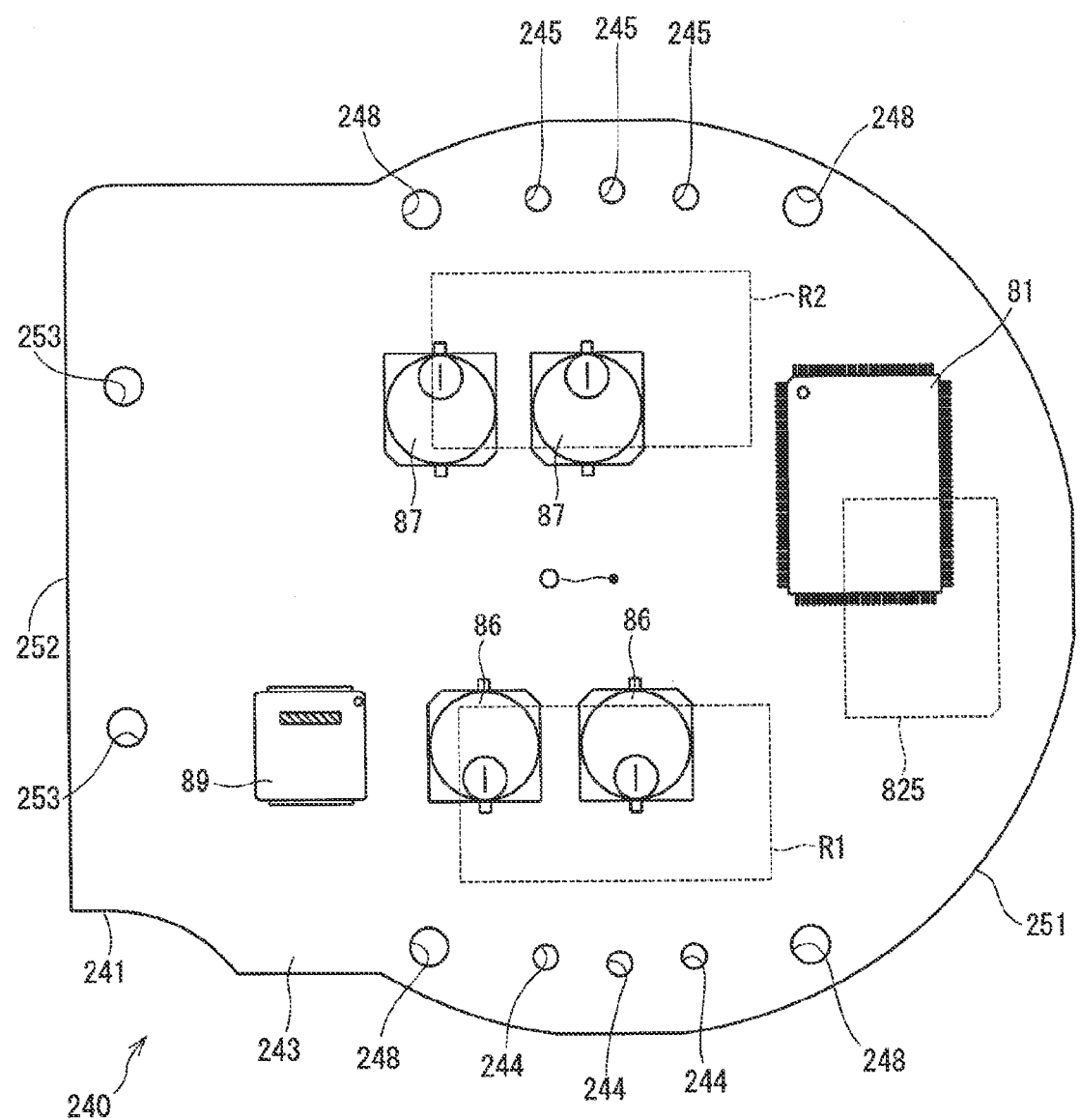
FIG. 17 is a plan view of an opposite side of the substrate in the second embodiment of the present disclosure.

As shown in FIGS. 10 and 11, the ASIC 82 has a mold part 825 molding a circuit component with resin, a terminal 826 protruding from the mold part 825, and a heat dissipation slug 827 in the present embodiment. The area where the mold part 825 of the ASIC 82 is positioned corresponds to an "IC component arrangement region" in the claims. In FIG. 17, the same naming applies.

In the following, heat dissipation of the ASIC 82 is described. The ASIC 82 has integrated circuits such as a pre-driver 821, a regulator 823 etc., which generate heat by a relatively large amount. Further, the ASIC 82 occupies a large area on the substrate 41.

As a reference example, heat dissipation toward the substrate side is considered. When heat is dissipated toward the substrate, a heat dissipation via is formed at a mounting position of the ASIC 82. When such a via is formed, wiring is not provided for a via forming area, thereby no other electronic component is mounted in such area.

In the present disclosure, the ASIC 82 is mounted on the heat generation element mounting surface 42, and heat of the ASIC 82 is dissipated to the frame member 20. Especially, by exposing the heat dissipation slug 827 from the mold part 825, the heat dissipation efficiency is raised. Therefore, it is not necessary to dissipate heat from the ASIC 82 to the substrate 41 side, i.e., there is no need to provide a heat dissipation via on the substrate 41. Thus, the wiring is arbitrarily provided on the large-size component mounting surface 43 in an overlapping area which at least partially overlaps the mounting area of the ASIC 82. Therefore, the electronic components may be mounted on the large-size component mounting surface 43 in the overlapping area of the ASIC 82. More practically, when the microcomputer 81 is, for example, mounted in such an overlapping area on the reverse side of the ASIC 82, the mounting surface of the substrate 41 is efficiently usable, since the microcomputer 81 is a large-size component. That is, a high-density mounting structure is realized for mounting various electronic components of the ECU 40 on the substrate 41 in the present embodiment.

The driver unit 1 is provided with the motor 10, the frame member 20, the substrate 41, the SW elements 51-56, 61-66, the ASIC 82, and the microcomputer 81 as described in full details above.

The motor 10 has the stator 12 on which the first winding group 13 and the second winding group 14 are wound, the rotor 15 rotatable relative to the stator 12, and the shaft 16 rotatable together with the rotor 15.

The frame member 20 is disposed on one side of the axial direction of the motor 10.

The substrate 41 is fixed on an opposite side of the motor 10 relative to the frame member 20.

The SW elements 51-56, 61-66 for constituting the inverter parts 50 and 60 which switch the electric current supplied to the winding groups 13 and 14 are mounted on the heat generation element mounting surface 42, which is one face of the substrate 41 facing the frame member 20, in a heat dissipatable manner for dissipating heat from those elements to the frame member 20.

The ASIC 82 includes at least one of the pre-driver 821, the regulator 823, and the signal amplifier 822, and is mounted on the heat generation element mounting surface 42 of the substrate 41 facing the frame member 20, in a heat dissipatable manner for dissipating heat from those elements to the frame member 20. The pre-driver 821 outputs a drive signal to the SW elements 51-56, 61-66. The regulator 823 adjusts an output voltage of the battery 109 to a preset voltage. The signal amplifier 822 amplifies an input signal.

The microcomputer 81 is mounted on the large-size component mounting surface 43, which is an opposite side of the heat generation element mounting surface 42 of the substrate 41, and the mounting position of the microcomputer 81 at least partially overlaps the mounting position of the ASIC 82.

According to the present embodiment, the SW elements 51-56, 61-66 and the ASIC 82 are heat-dissipatably mounted for dissipating heat to the frame member 20. That is, the frame member 20 defines an outline of the motor 10, while serving as a heat sink. In such manner, compared to provide a heat sink separately, the number of components is reduced, and the axial size of the driver unit 1 is reduced.

Further, in the present embodiment, by enabling heat of the ASIC 82, which is a heat generator generating relatively-large amount of heat due to the integration of circuits, to be dissipated to the frame member 20, the heat dissipation via required for dissipating heat from the ASIC 82 to the substrate 41 is dispensable. Therefore, the reverse side of the ASIC 82 mounting position is available for mounting the electronic components, thereby enabling a high-density mounting for efficiently utilizing the surfaces on both sides of the substrate 41. That contributes to the volume reduction of the driver unit 1.

In the present embodiment, the electronic component mounted at an overlapping position on the large-size component mounting surface 43 (i.e., partially overlapping with the ASIC 82 on the reverse side) is the microcomputer 81 which performs data processing. The mounting area size of the microcomputer 81 is relatively large on the substrate 41. By mounting such a component on the reverse side of the ASIC 82, the efficiency of the mounting surface is improved. Further, wiring length between the microcomputer 81 and the ASIC 82 is reduced.

There are two inverter parts 50, 60 in the driver unit 1. The first region R1 where the SW elements 51-56 constituting the first inverter part 50 is symmetrically positioned against the second region R2 where the SW elements 61-66 constituting the second inverter part 60 relative to the center axis O of the motor 10.

When the driver element mounting region R3 is defined as including the first region R1, the second region R2, and the center axis O of the motor 10, the ASIC 82 is arranged on the outside of the drive element mounting region R3.

By positioning the SW elements 51-56 and the SW elements 61-66 on both sides of the driver element mounting region R3 which is a center region of the substrate 41, (i.e., opposite to each other relative to the center axis O) and by positioning the large component ASIC 82 on the outside thereof, the mounting surface of the heat generation element mounting surface 42 of the substrate 41 is effectively utilized, and each of the elements is appropriately positioned.

The driver unit 1 is further provided with the power relays 71, 72 and reverse connection protection relays 73, 74. The power relays 71, 72 and reverse connection protection relays 73, 74 are mounted on the heat generation element mounting surface 42 which is a side facing the frame member 20 of the substrate 41, and enabling the switching of conduction and interruption of the electric current of the power supply from the battery 109 to the inverter parts 50, 60. The relays are positioned on an opposite side of the ASIC 82 relative to the drive element mounting region R3.

Thereby, the mounting surface, (i.e., the heat generation element mounting surface 42 of the substrate 41) is efficiently utilized, and each of the elements is appropriately arranged.

The driver unit 1 is further provided with the capacitors 86 and 87 mounted on the large-size component mounting surface 43 which faces the frame member 20 of the substrate 41, which are mounted at the positions that at least partially overlaps with the first region R1 or the second region R2.

By mounting the capacitors 86 and 87 which are relatively large-size parts on the large-size component mounting surface 43 that is an opposite side of (i.e., facing away from) the frame member 20, heat dissipation from the heat generation element 70 to the frame member 20 is not obstructed, thereby appropriately facilitating the dissipation of heat generated by the heat generation element 70 to the frame member 20. Further, compared with other arrangement, a noise reduction effect increases by positioning the capacitors 86 and 87 in a partially-overlapping manner either with the first region R1 or the second region R2.

The driver unit 1 of the present embodiment is applied to the electric power steering device 8. That is, the electric power steering device 8 is provided with the driver unit 1 and the speed reduction gear 9 which transmits the torque outputted from the motor 10 to the column shaft 102, and assists the operation of the steering wheel 101 by the driver based on the drive of the column shaft 102 by the torque of the motor 10.

As for the driver unit 1 of the present embodiment, the motor 10 and the ECU 40 are co-axially disposed, and the substrate that bears various electronic components for the drive control of the motor 10 is attached to the frame member 20 to be disposed on one axial end of the motor 10, enabling the high-density mounting of the electronic component. The driver unit 1 having the axial size reduced in such manner is more workable (i.e., installable) into a small space in the vehicle, for example. Further, the driver unit 1 of the present embodiment has the O ring 39 disposed between the motor case 11 and the frame member 20, and the frame member 20 and the cover member 90 are attached with adhesives to realize a waterproof structure. Therefore, the driver unit 1 may be installed in an engine room, for example, and the driver unit 1 may be suitably applicable to a rack assist type electric power steering device.

(Second Embodiment)

Figure 12:
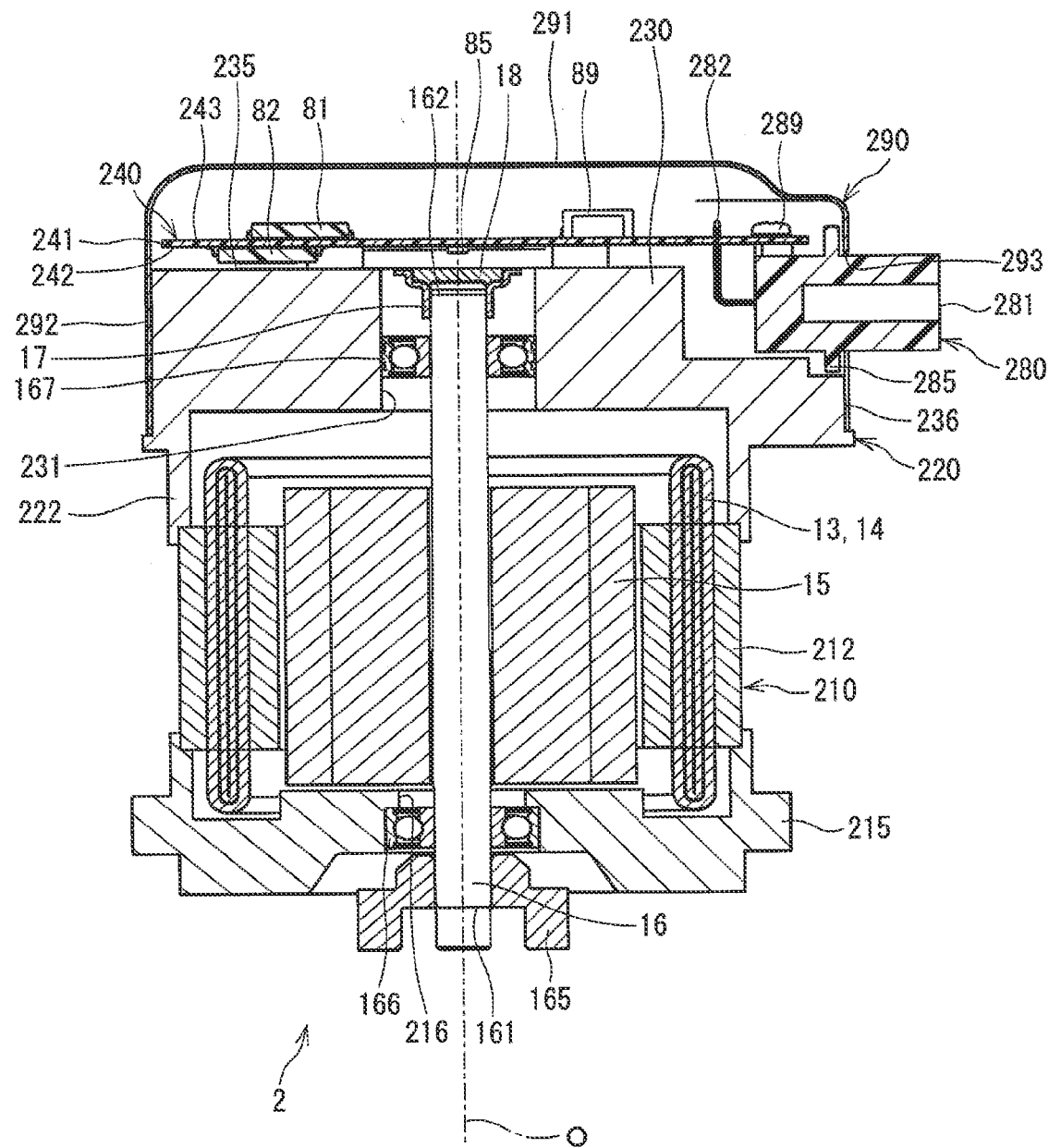
FIG. 12 is a sectional view of the driver unit in a second embodiment of the present disclosure.
Figure 13:
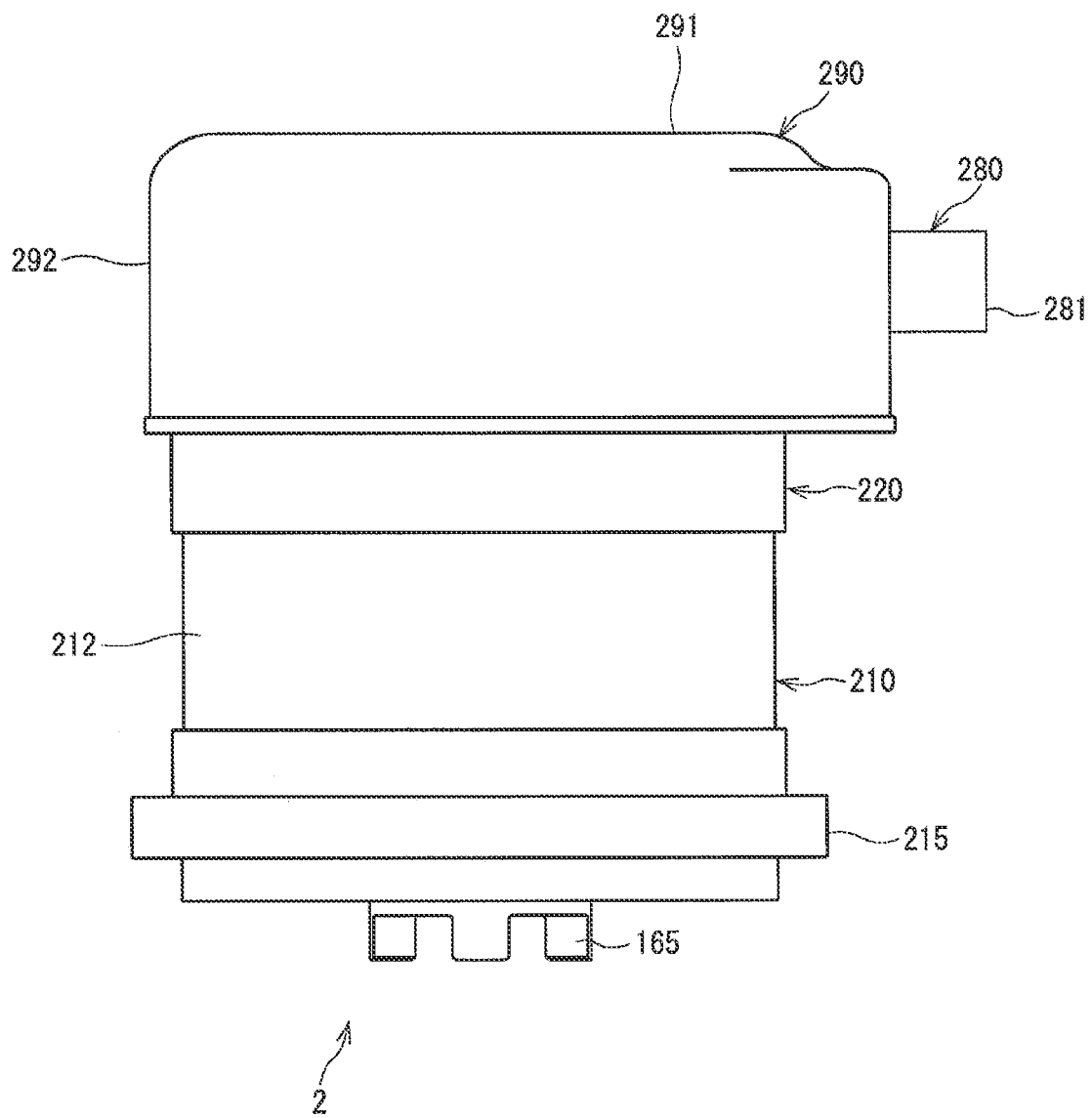
FIG. 13 is a side view of the driver unit in the second embodiment of the present disclosure.
Figure 14:
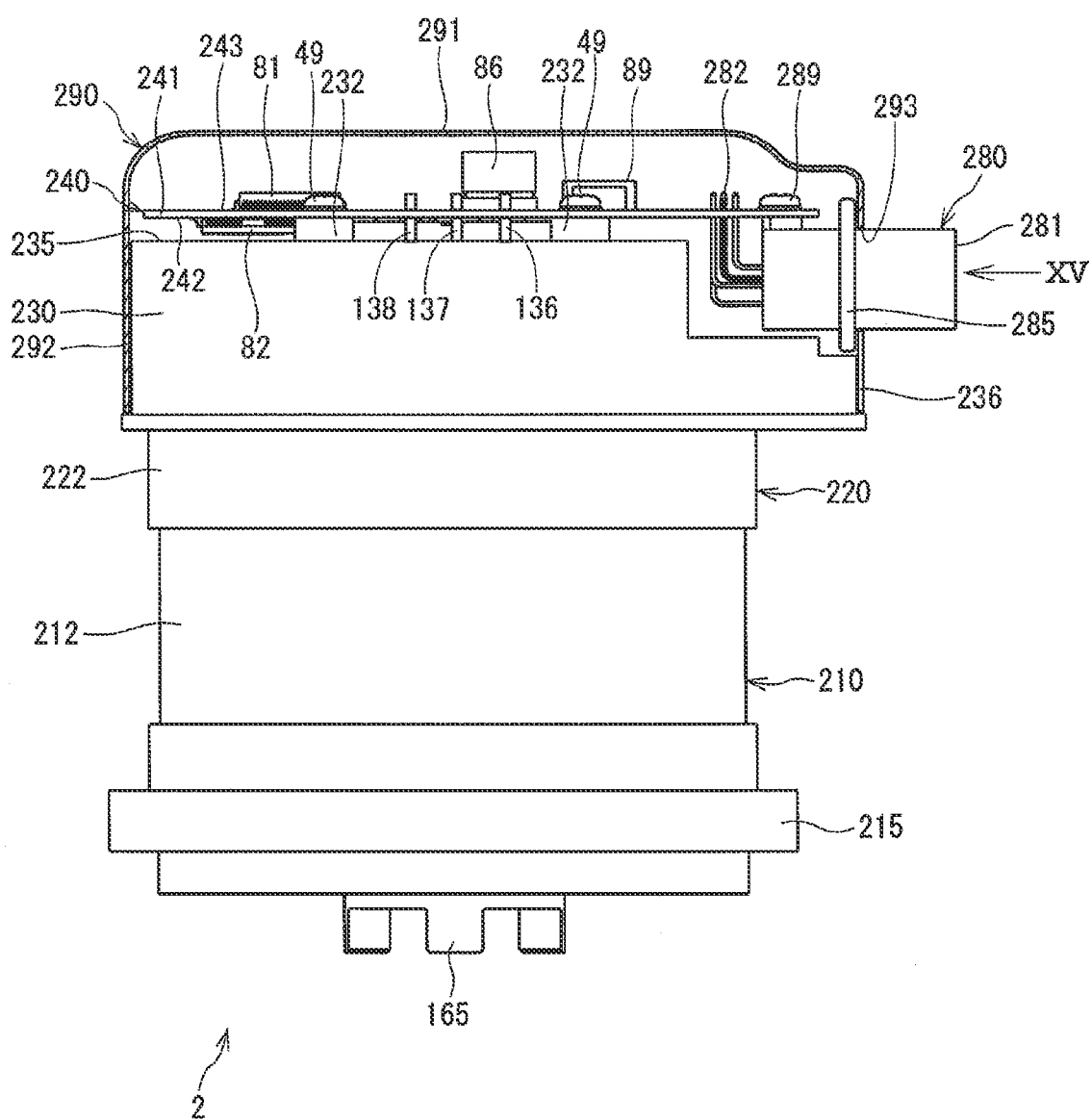
FIG. 14 is a side view of the driver unit in which a part of a cover member in FIG. 13 is removed.
Figure 15:
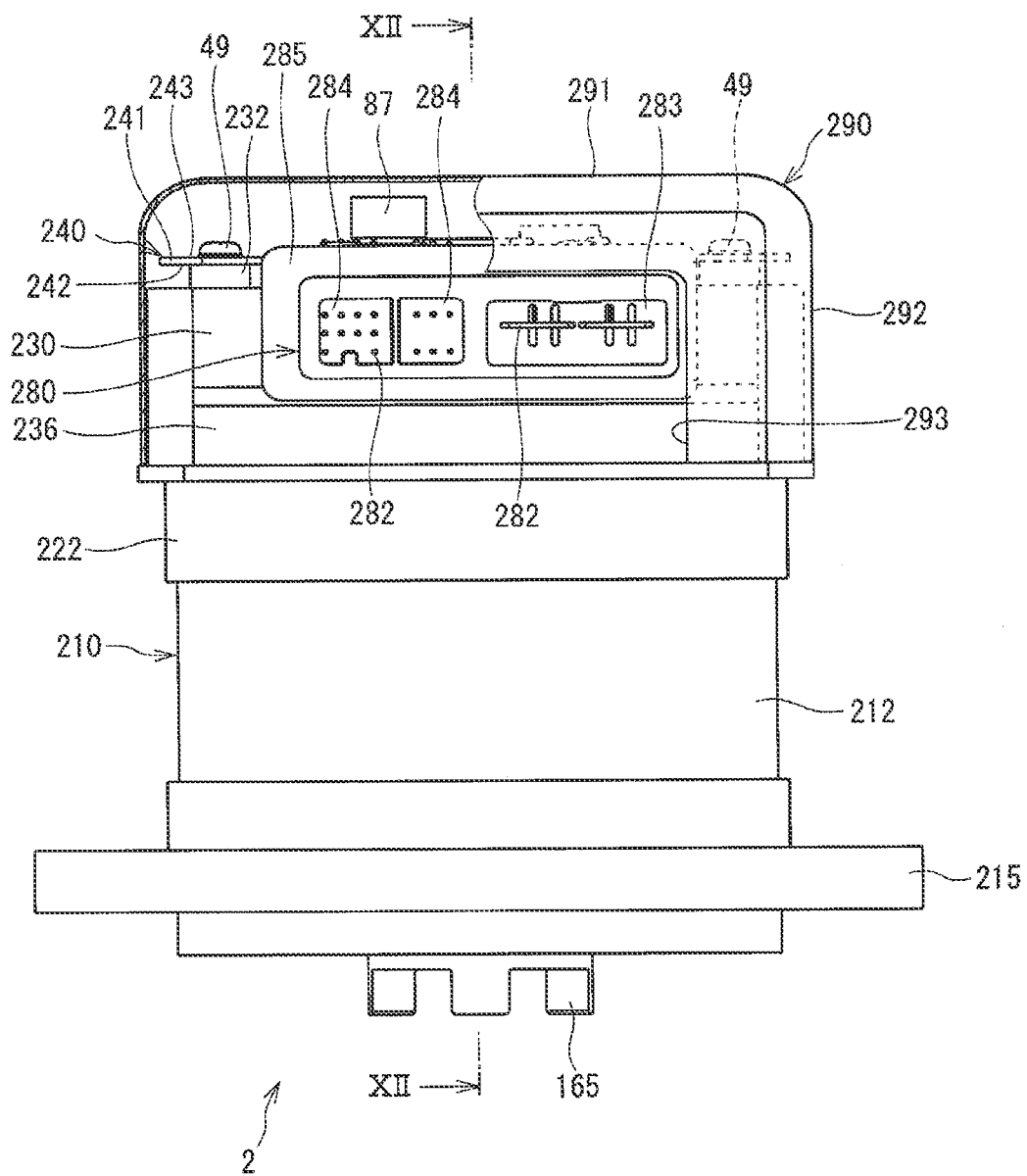
FIG. 15 is a side view of the driver unit along an arrow XV in FIG. 14.

The driver unit in the second embodiment of the present embodiment is shown in FIGS. 12-17. FIG. 12 is a sectional view along a XII-XII line in FIG. 15. In each of the drawing concerning the present embodiment, the capacitors 86 and 87 are not illustrated.

A driver unit 2 is provided with a motor 210 serving as a rotating electric machine, a front frame end 215, a rear frame end 220, the ECU 240 serving as a controller, a connector 280, a cover member 290 and the like. In the present embodiment, the rear frame end 220 corresponds to a "frame member." The electric configuration of the driver unit 2 is the same as that of the above-mentioned embodiment, thereby no repetitive description is provided.

The motor 210 is provided with a stator 212, the rotor 15, the shaft 16 as shown in FIG. 12, together with other parts.

The stator 212 has the front frame end 215 and the rear frame end 220 fixed thereon. In the present embodiment, a motor case is not provided, and the stator 212 is exposed. Other features other than the above is the same as that of the stator 12 of the above-mentioned embodiment. That is, in the driver unit 2 of the present embodiment, the stator 212 is exposed, and does not have a waterproof structure. Therefore, the driver unit 2 of the present embodiment is preferably disposed in a vehicle compartment rather than in an engine room, and is preferably applicable to a column assist type electric power steering device.

In the present embodiment, since the motor case is omitted, the "motor region" is considered as a projection silhouette of the stator 212.

The front frame end 215 is made from, for example, metal, e.g. aluminum or the like, and is provided on the opposite end of the motor 210 relative to the ECU 240. The front frame end 215 has a shaft hole 216 bored substantially at the center thereof. The bearing 166 is attached to the front frame end 215, and one end 161 of the shaft 16 is inserted thereinto. The one end 161 of the shaft 16 is exposed from the front frame end 215. The one end 161 of the shaft 16 is provided as an output end 165. The output end 165 is connected to the speed reduction gear 9. Thereby, the torque generated by the rotation of the rotor 15 and the shaft 16 is output to the column shaft 102 via the speed reduction gear 9.

As shown in FIGS. 12-15, the rear frame end 220 has a frame part 222, a heat dissipator 230, and a connector receiver 236, for example, and is made with thermally-conductive metal, e.g. aluminum or the like, and is disposed on the ECU 240 side of the motor 210. The front frame end 215 and the rear frame end 220 are combined by using a through bolt (not illustrated), with the motor 210 interposed therebetween. Further, the rear frame end 220 has a motor line insertion hole (not illustrated) bored thereon. The motor lines 135 and 145 are inserted into the motor line insertion hole, and are taken out to extend toward the ECU 240.

The frame part 222 has a ring shape, and is attached to the stator 212 of the motor 210.

The heat dissipator 230 stands on the frame part 222 to extend toward the ECU 240. The heat dissipator 230 has a substrate fixing part 232. A surface of the heat dissipator 230 facing the ECU 240 is formed as a radiation surface 235.

A shaft hole 231 is bored at the center axis O of the heat dissipator 230. The shaft hole 231 has a bearing 167 disposed therein, and an other end 162 of the shaft 16 is inserted thereinto. Thereby, the magnet 18 provided on the other end 162 of the shaft 16 is exposed to the ECU 240.

The connector receiver 236 protrudes from the heat dissipator 230 toward a radius outside thereof. Next to the connector receiver 236, a connector 280 is disposed on the ECU 240 side. The connector receiver 236 and the connector 280 are separated with a gap in between.

The ECU 240 is disposed on an opposite side of the rear frame end 220 relative to the motor 210, and is positioned substantially co-axially with the motor 210.

The ECU 240 has a substrate 241 on which various electronic components are mounted.

The substrate 241 takes a shape that fits in the projection region of the rear frame end 220. Further, the components of the ECU 240, (i.e., the SW elements 51-56, 61-66, the current detection elements 57-59, 67-69, the capacitors 86, 87, and the choke coil 89) which are mounted on the substrate 241, are arranged in the motor region.

Here, a motor side surface of the substrate 241, which faces the motor 210, is designated as a heat generation element mounting surface 242, and an opposite surface of the substrate 241, which faces away from the motor 210, is designated as a large-size component mounting surfaces 243. In the present embodiment, the heat generation element mounting surface 242 corresponds to a "first surface", and the large-size component mounting surface 243 corresponds to a "second surface."

Figure 16:
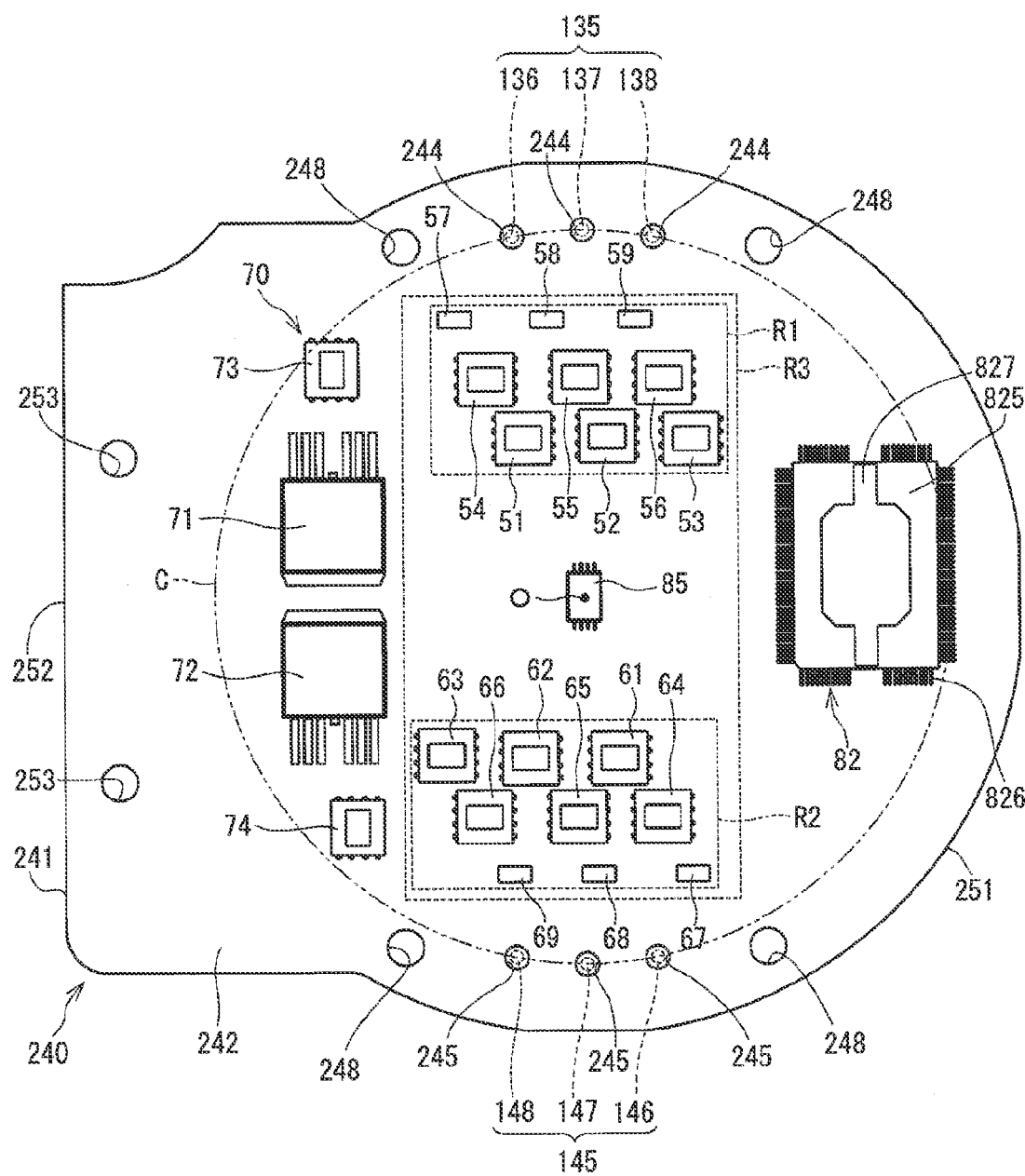
FIG. 16 is a plan view of a frame member side of a substrate in the second embodiment of the present disclosure.

As shown in FIG. 16, the heat generation element mounting surface 242 has the SW elements 51-56, 61-66, the current detection elements 57-59, the power relays 71, 72, reverse connection protection relays 73, 74, the ASIC 82, the rotational angle sensor 85 and the like mounted thereon.

In the present embodiment, the SW elements 51-56 61-66, the current detection elements 57-59, 67-69, the power relays 71, 72, the reverse connection protection relays 73, 74, and the ASIC 82 contacts the radiation surface 235 of the heat dissipator 230 of the rear frame end 220 the radiator via the heat dissipation gel in a heat dissipatable manner. Thereby, heat generated by the SW elements 51-56, 61-66, the power relays 71, 72, the reverse connection protection relays 73, 74, and the ASIC 82 is dissipated to the rear frame end 220 via the heat dissipation gel.

Since the ASIC 82 is mounted on the heat generation element mounting surface 242 of the substrate 241 in a heat dissipatable manner to dissipate heat to the heat dissipator 230, the electric components are mountable in an overlapping region on the large-size component mounting surface 243, which overlaps the mounting area of the ASIC 82. In the present embodiment, on large-size component mounting surface 243, the microcomputer 81 is mounted in a region which at least partially overlaps with the ASIC 82, (refer to FIG. 12 and FIG. 17), which is similar to the above-mentioned embodiment.

In the present embodiment, the SW elements 51-56 constituting the first inverter part 50 and the SW elements 61-66 constituting the second inverter part 60 are symmetrically arranged around the center axis O of the motor 10 (i.e., a part where the rotational angle sensor 85 is disposed on the present embodiment). In the present embodiment, the SW elements 51-56 and the SW elements 61-66 are arranged around center axis O of the motor 10 in a point-symmetric manner. in addition, the phase sequence is arranged in the same manner as the above-mentioned embodiment (i.e., U, V, W phases in order from the power relay 71 side in the first inverter part 50, and the W, V, U phases in order from the power relay 72 side in the second inverter part 60).

About the arrangement and other matter not mentioned above regarding the electronic components on the substrate 241 are also the same as the above-mentioned embodiment.

A motor line insertion section 244 is bored at a radius outside position outer than the first region R1 where the elements constituting the first inverter part 50 of the substrate 241 are mounted. The motor line 135 is inserted into the motor line insertion section 244, and is connected to the motor line insertion section 244 by solder or the like.

A motor line insertion section 245 is bored at a radius outside position outer than the second region R2 where the elements constituting the second inverter part 60 of the substrate 241 are mounted. The motor line 145 is inserted into the motor line insertion section 245, and is connected by solder or the like.

The motor line insertion sections 244 and 245 are positioned on a circle C that is centered on the center axis O. That is, the motor lines 135 and 145 are arranged on the substrate 241 on the circle C. In the present embodiment, the motor lines 135 and 145 are taken out from the winding groups 13 and 14 winding wire of which is wound on the stator 212. By arranging the motor line insertion sections 244 and 245 on the same circle, the motor lines 135 and 145 extend straight from the stator 212 toward the substrate 41, thereby making it easy for the motor lines 135 and 145 to be connected to the substrate 241.

A hole 248 is bored at a position corresponding to the substrate fixing part 232 of the substrate 241. A substrate lockscrew 49 is inserted into the hole 248, and is screwed onto the substrate fixing part 232 of the rear frame end 220. Thereby, the substrate 241 is fixed onto the rear frame end 220.

The substrate 241 has an arc part 251 having an arc shape and a connector fixing part 252 disposed at a radius outside of the arc part 251. The connector fixing part 252 has a hole 253 bored thereon into which a connector lockscrew 289.

The connector fixing part 252 is positioned outside of the power relays 71, 72 and the reverse connection protection relays 73, 74 on the heat generation element mounting surface 242 of the substrate 241, and the connector 280 is positioned on the connector fixing part 252.

As shown in FIGS. 12-15, the connector 280 is fixed onto the substrate 241 by the connector lockscrew 289 inserted from the large-size component mounting surface 243 side of the substrate 241.

The connector 280 is made from resin or similar material, is disposed to protrude outward from the substrate 241, and is positioned on the ECU 240 side facing the rear frame end 220 within proximity of the connector receiver 236 (i.e., the connector 280 is positioned between the rear frame end 220 and the ECU 240). In other words, the connector 280 is positioned on the ECU 240 side of the frame part 222, near the connector receiver 236 of the rear frame end 220, and more closely describes how the connector 280 is positioned on the controller side of the frame member.

In the present embodiment, the connector 280 is positioned on the heat generation element mounting surface 242 side of the substrate 241, which is beneficial for heat dissipation, because the heat dissipator 230 can rise up from the rear frame end 220 by the height of the connector 280, expanding a heat dissipation surface area and increasing a heat mass dissipated therefrom. That is, heat generated by the heat generation element 70 may be efficiently dissipated from the heat dissipator 230.

An opening 281 of the connector 280 faces outward, and is connectable to a harness incoming from radius outside of the driver unit 2. Further, the connector 280 has a terminal 282. The terminal 282 is connected to the substrate 241.

The connector 280 of the present embodiment has a power supply connector 283 and a signal connector 284 integrally formed to have one body. The outer periphery of the connector 280 is formed as a flange 285.

A cover member 290 is made from metallic material, and is formed to have a separate body from the connector 280. The cover member 290 has a top part 291 and a side wall 292 formed along the periphery of the top part 291, and covers the ECU 240, and is fixed onto the rear frame end 220 by caulking or the like.

The side wall 292 has a notch 293 suitably formed to accommodate the connector 280. The opening 281 side of the connector 280 is thus exposed from the cover member 290.

In the present embodiment, the flange 285 has a motor side face exposed from the cover member 290, based on an assumption that the motor 10 is positioned on a vertically-lower side in the driver unit 2 after installation into the vehicle. By disposing the flange 285, water or the like is prevented from intruding into the inside of the driver unit 2 via a connection part between the cover member 290 and the connector 280. Further, water permeated in an inside is transported toward an outside of the driver unit 2 along the flange 285.

The configuration of the present embodiment also achieves the same effects as the earlier-mentioned embodiment.

(Other Embodiments)
(a) Frame Member

According to the above-mentioned embodiments, the frame member is fixed onto the motor case by the frame lockscrew. According to other embodiments, the frame member may be fixed onto the motor case by using a component other than a screw thread. Further, the frame member may be fixed onto the motor case by press-fitting. In such manner, the number of components may be reduced. Further, the volume along the radius of the driver unit may be reduced.

(b) ECU

According to the above-mentioned embodiments, the inverter part and the relay are provided in two sets. According to other embodiments, the inverter part and the relay may be provided in three sets or more.

According to the above-mentioned embodiments, the heat generation element may contact the frame member via the heat dissipation gel. According to other embodiment, the heat dissipation gel may be replaced with a heat dissipation sheet, or the heat generation element and the frame member may contact directly.

According to the above-mentioned embodiments, the SW elements have the heat dissipation slug exposed from the mold part. According to other embodiments, the heat dissipation slug is not necessarily exposed from the SW element. The same applies to the power relay, the reverse connection protection relay, and the ASIC.

According to the above-mentioned embodiments, the drive element, the current detection element, the power relay, the reverse connection protection relay, and the ASIC correspond to the heat generation element, and these heat generation elements are disposed to dissipate heat from their backs to the frame member. According to other embodiments, the current detection element, the power relay, and the reverse connection protection relay may be mounted on the large-size component mounting surface, or may be omitted.

Further, the current detection element may be implemented not as the shunt resistor, but as a hall IC etc., and the current detection element may only be provided for two phases. That is, the current detection element may be partially omitted. The power relay may be implemented as a mechanical relay.

Further, electronic components other than the above may also be mounted on the heat generation element mounting surface of the substrate as heat generation elements, to be enabled to dissipate heat from their backs toward the frame member.

According to the above-mentioned embodiments, the SW element constituting the first inverter part and the SW element constituting the second inverter part are arranged at axial symmetry in the first embodiment, and the SW element constituting the first inverter part and the SW element constituting the second inverter part are arranged at point symmetry in the second embodiment. In other embodiments, the SW elements having the first embodiment configuration may have a point symmetry arrangement, or the SW element having the second embodiment configuration may have a axial symmetry arrangement.

Further, the SW element may also be arranged arbitrarily (i.e., not necessarily be in a symmetrical arrangement).

Further, the electronic components other than the SW element may also be arranged arbitrarily.

Further, according to the above-mentioned embodiment, the phase sequence in the first system is U, V, W from the near side of the power relay, and the phase sequence in the second system is W, V, U from the near side of the power relay. According to other embodiments, the phase sequence in the first system may be arbitrarily ordered (i.e., not necessarily be U, V, W order from the power relay side). Further, the phase sequence in the second system may preferably be the reverse order of the first system. In such manner, the magnetic flux leakage from the rotational angle sensor is reduced, just like the above-mentioned embodiment. Further, the variation of the wiring impedance among the different phases is reduced. Further, the phase sequences in the first and second systems may not be necessarily reversed.

According to the above-mentioned embodiments, the integrated circuit component includes the pre-driver, the signal amplifier, and the regulator. According to other embodiments, the integrated circuit component may include, in addition to at least one of the pre-driver, the signal amplifier, and the regulator, other components, such as a communication component for the communications with other devices, for example.

According to the above-mentioned embodiments, in the overlapping area on the opposite surface, (i.e., the surface facing away from the rotating electric machine) which at least partially overlapping with the integrated circuit components mounting region, the microcomputer is mounted. According to other embodiments, in the overlapping area on the opposite surface, (i.e., the surface facing away from the rotating electric machine) which at least partially overlapping with the integrated circuit components mounting region, electronic components other than the microcomputer may be mounted. That is, in such an area, the capacitors or the like may be mounted.

According to the first embodiment, the metal piece used for connection to the motor line is mounted on the substrate, and the substrate and the motor line are connected by press-fitting. Further, in the second embodiment, the substrate and the motor line are connected by solder or the like.

According to other embodiments, the substrate and the motor line in the first embodiment configuration may be connected by solder, or the motor line may be connected to the substrate by press-fitting the metal piece that is disposed on the substrate, for example. Further, the connection between the substrate and the motor line may be made not only by press-fitting or soldering but also by any other method.

According to the above-mentioned embodiments, the substrate is fixed onto the frame member by using the substrate lockscrew. In other embodiments, the substrate may be fixed onto the frame member not only by using a screw thread but by any other method.

(c) Connector

According to the first embodiment, the connector comprises one power supply connector and two signal connectors. According to other embodiments, one of the above or both connectors may be provided two sets or more. Those connectors may have separate bodies as in the first embodiment, or may have an integrated body as in the second embodiment.

Further, the number of connectors, the orientation of the opening of the connector, and the cover member arrangement as to having one body with the connector or not, may all be arbitrarily combined.

(d) Cover Member

According to the first embodiment, the cover member is fixed onto the frame member with adhesives. According to the second embodiment, the cover member is caulked to the frame member. The cover member may be fixed onto the frame member by any other method such as fixing by using a screw or the like.

(e) Driver Unit

According to the above-mentioned embodiments, the rotating electric machine is a three-phase brushless motor. According to other embodiments, the motor may be any kind (i.e., not necessarily the three-phase brushless motor).

Further, the rotating electric machine may not be only a motor (i.e., an electric motor) but a generator, and may also be a motor-generator having a motor function and a generator function. Further, the winding may be formed not only in two systems, but also in three systems.

According to the above-mentioned embodiments, the driver unit is applied to an electric power steering device. According to other embodiments, the driver unit may be applied to a device other than the electric power steering device.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A driver unit comprising:
a rotating electric machine having a stator on which a winding is wound, a rotor rotatably disposed relative to the stator, and a shaft that rotates together with the rotor;
a frame member disposed on one axial end of the rotating electric machine;
a substrate fixed on an opposite side of the frame member relative to the rotating electric machine;
a driver element comprising at least one inverter for switching an electric current supplied to the winding, the driver element mounted on a first surface of the substrate facing the frame member for dissipating heat to the frame member;
an Integrated Circuit (IC) component disposed on the first surface for dissipating heat to the frame member, the IC component including at least one of a pre-driver that outputs a drive signal to the driver element, a regulator that regulates a voltage of a power source and outputs the regulated voltage, and a signal amplifier for amplifying an input signal; and
an electronic component mounted on a second surface that is opposite to the first surface of the substrate, a position of the electronic component on the second surface positioned at least partially overlapping with a position of the IC component.

2. The driver unit of claim 1, wherein
the electronic component comprises a calculation circuit component for performing data processing.

3. The driver unit of claim 1,
wherein the at least one inverter further comprises two inverters that are provided on the substrate, and
the substrate includes:
   a first region in which the driver element to be serving as one of the two inverters is mounted; and
   a second region in which the driver element to be serving as another one of the two inverters are positioned opposite to each other, relative to the center axis of the rotating electric machine.

4. The driver unit of claim 3, wherein
a drive element mounting region is defined to include the first region, the second region and a region having a center axis of the rotating electric machine, and
the IC component is positioned outside of the drive element mounting region.

5. The driver unit of claim 4 further comprising:
a relay disposed on the first surface and configured to switch between conduction and interruption of an electric current supplied from the power supply to the inverter, wherein
the relay is positioned on an opposite side of the IC component relative to the drive element mounting region.

6. The driver unit of claim 3 further comprising: a capacitor mounted on the second surface at a position that at least partially overlaps with the first region or the second region.

7. An electric power steering device comprising:
a driver unit comprising:
   a rotating electric machine having a stator on which a winding is wound, a rotor rotatably disposed relative to the stator, and a shaft that rotates together with the rotor;
   a frame member disposed on one axial end of the rotating electric machine;
   a substrate fixed on an opposite side of the frame member relative to the rotating electric machine;
   a driver element comprising an inverter for switching an electric current supplied to the winding, the driver element mounted on a first surface of the substrate facing the frame member for dissipating heat to the frame member;
   an Integrated Circuit (IC) component disposed on the first surface for dissipating heat to the frame member, the IC component including at least one of a pre-driver that outputs a drive signal to the driver element, a regulator that regulates a voltage of a power source and outputs the regulated voltage, and a signal amplifier for amplifying an input signal; and
   an electronic component mounted on a second surface that is opposite to the first surface of the substrate, a position of the electronic component on the second surface positioned at least partially overlapping with a position of the IC component; and
a gear transmitting a torque that is output from the rotating electric machine to a driver object, wherein
the driver object is driven by using the torque of the rotating electric machine to assist a steering operation of a steering wheel by a driver.

* * * * *